(12) United States Patent
Mochinaga et al.

(10) Patent No.: US 9,456,194 B2
(45) Date of Patent: Sep. 27, 2016

(54) RECEPTION/REPRODUCTION DEVICE, TRANSMISSION DEVICE, RECEPTION/REPRODUCTION METHOD AND TRANSMISSION METHOD

(75) Inventors: Kazuhiro Mochinaga, Hyogo (JP); Hiroshi Yahata, Osaka (JP); Yasushi Uesaka, Hyogo (JP); Tomoki Ogawa, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 48 days.

(21) Appl. No.: 14/131,327

(22) PCT Filed: Aug. 3, 2012

(86) PCT No.: PCT/JP2012/004942
§ 371 (c)(1),
(2), (4) Date: Jan. 7, 2014

(87) PCT Pub. No.: WO2013/021600
PCT Pub. Date: Feb. 14, 2013

(65) Prior Publication Data
US 2014/0150045 A1    May 29, 2014

Related U.S. Application Data

(60) Provisional application No. 61/515,466, filed on Aug. 5, 2011.

(51) Int. Cl.
*H04N 13/00* (2006.01)
*H04N 21/234* (2011.01)
(Continued)

(52) U.S. Cl.
CPC ........ *H04N 13/0044* (2013.01); *H04N 5/4403* (2013.01); *H04N 13/0018* (2013.01);
(Continued)

(58) Field of Classification Search
CPC .............. H04N 13/0044; H04N 13/0066; H04N 13/0454; H04N 2005/4412; H04N 21/23418; H04N 21/2362; H04N 21/4221; H04N 21/44008; H04N 21/4854; H04N 21/816; H04N 21/8456; H04N 5/4403; H04N 13/0018; H04N 13/0275; H04N 13/0282; H04N 21/8146
See application file for complete search history.

(56) References Cited

U.S. PATENT DOCUMENTS

2003/0048354 A1    3/2003   Takemoto et al.
2003/0067554 A1*   4/2003   Klarfeld ............... G11B 27/105
                                                    348/461
(Continued)

FOREIGN PATENT DOCUMENTS

EP    2 352 303 A1    8/2011
EP    2352303 A1 *   8/2011
(Continued)

OTHER PUBLICATIONS

International Search Report issued Oct. 23, 2012 in corresponding International Application No. PCT/JP2012/004942.
(Continued)

*Primary Examiner* — Rong Le
(74) *Attorney, Agent, or Firm* — Wenderoth, Lind & Ponack, L.L.P.

(57) ABSTRACT

To provide a reception and playback device capable of playing back a program in viewer's desired display mode. The reception and playback device receives, with respect to a program that is currently played back in a first display mode, a switching instruction to switch from the first display mode to a second display mode, receives switching permission information indicating whether switching of a playback target stream of the program is permissible from a first stream to a second stream respectively corresponding to the first display mode and the second display mode, when receiving the switching instruction, judges whether switching of the display mode is permissible from the first display mode to the second display mode based on the switching permission information, when judging affirmatively, switches from the first stream to the second stream to perform playback using the second stream, and when judging negatively, performs playback using the first stream.

12 Claims, 23 Drawing Sheets

(51) Int. Cl.

| | |
|---|---|
| *H04N 21/44* | (2011.01) |
| *H04N 13/02* | (2006.01) |
| *H04N 21/81* | (2011.01) |
| *H04N 13/04* | (2006.01) |
| *H04N 21/422* | (2011.01) |
| *H04N 5/44* | (2011.01) |
| *H04N 21/2362* | (2011.01) |
| *H04N 21/485* | (2011.01) |
| *H04N 21/845* | (2011.01) |

(52) U.S. Cl.
CPC ...... *H04N13/0066* (2013.01); *H04N 13/0275* (2013.01); *H04N 13/0282* (2013.01); *H04N 13/0454* (2013.01); *H04N 21/2362* (2013.01); *H04N 21/23418* (2013.01); *H04N 21/4221* (2013.01); *H04N 21/44008* (2013.01); *H04N 21/4854* (2013.01); *H04N 21/816* (2013.01); *H04N 21/8146* (2013.01); *H04N 21/8456* (2013.01); *H04N 2005/4412* (2013.01)

(56) References Cited

U.S. PATENT DOCUMENTS

| | | | |
|---|---|---|---|
| 2011/0043614 A1* | 2/2011 | Kitazato | 348/51 |
| 2011/0115888 A1 | 5/2011 | Matsumoto et al. | |
| 2011/0119709 A1* | 5/2011 | Kim et al. | 725/39 |
| 2011/0242292 A1* | 10/2011 | Kato | 348/51 |

FOREIGN PATENT DOCUMENTS

| | | |
|---|---|---|
| JP | 2003-111101 | 4/2003 |
| JP | 3789794 | 6/2006 |
| JP | 2011-66871 | 3/2011 |
| JP | 2011-82666 | 4/2011 |
| JP | 2011-124971 | 6/2011 |

OTHER PUBLICATIONS

"Operational Guidelines for Digital Terrestrial Television Broadcasting", ARIB Technical Report, ARIB TR-B14, Mar. 28, 2011 (with partial English translation).

* cited by examiner

FIG. 7

| Channel ID | Channel name | Program ID | Program title | Date/Time | 3D images | 3D playback mode | Switching destination information ||| T100 |
|---|---|---|---|---|---|---|---|---|---|---|
| | | | | | | | Simulcast | Switchable section information || Stream ID |
| 1 | TV station A | 100 | Baseball Game | 2012.5.29 19:00 – 2012.5.29 21:00 | — | — | Yes, Identification information of switching destination | Time[0], duration[0] : Time[i], duration[i] | | × |
| 2 | TV station A | 200 | Baseball Game | 2012.5.29 19:00 – 2012.5.29 21:00 | Included | SBS | Yes, Identification information of switching destination | Time[0], duration[0] : Time[i], duration[i] | | × |

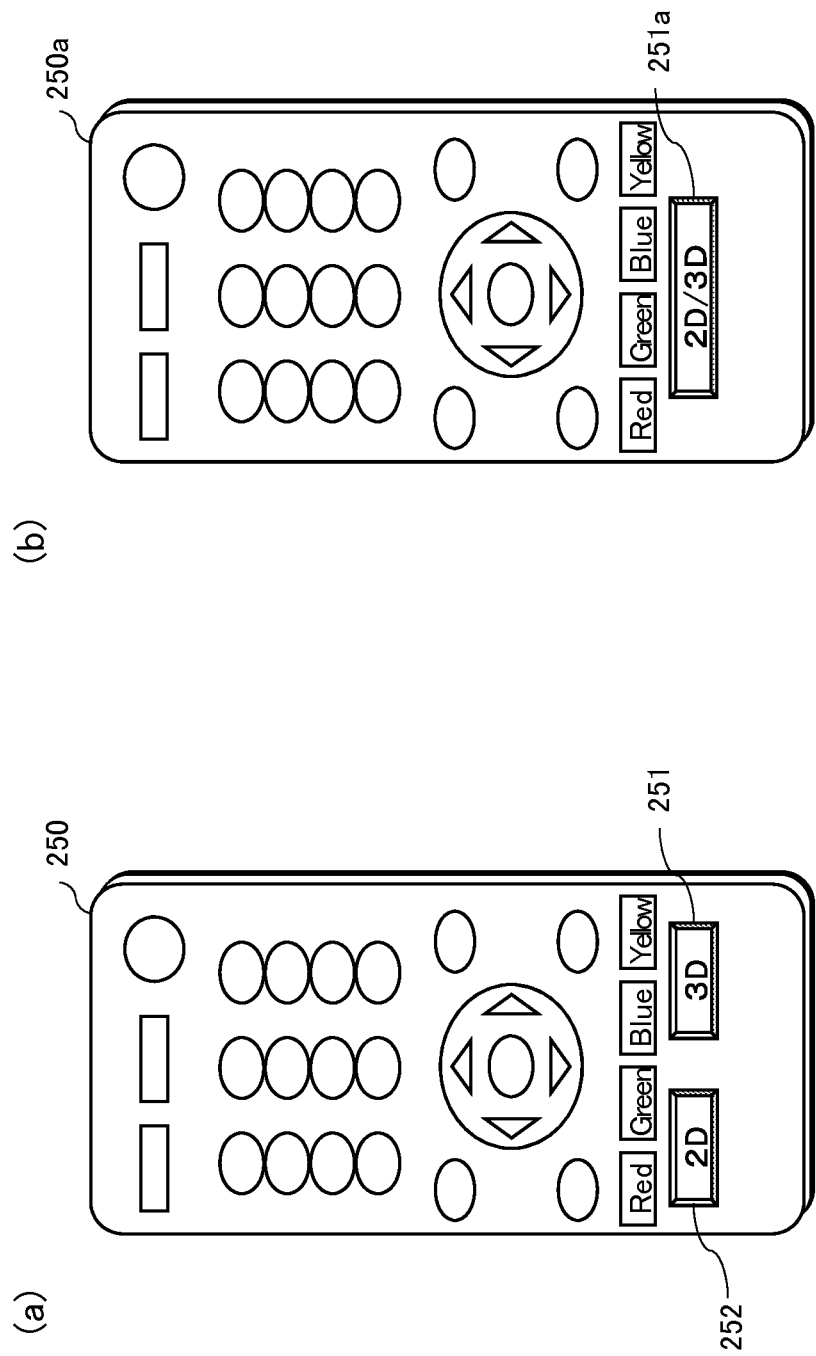

RECEPTION/REPRODUCTION DEVICE, TRANSMISSION DEVICE, RECEPTION/REPRODUCTION METHOD AND TRANSMISSION METHOD

This application is the National Stage of International Application No. PCT/JP2012/004942, filed Aug. 3, 2012, which claims the benefit of U.S. Provisional Application No. 61/515,466, filed Aug. 5, 2011.

TECHNICAL FIELD

The present invention relates to a device that transmits streams in different display modes with respect to the same program, and a device that receives and plays back the streams in the different display modes.

BACKGROUND ART

Progress in digitization of TV broadcasting encourages further improvement in image quality and introduction of programs for 3D viewing (hereinafter, referred to as 3D programs). A major 3D playback mode employed for 3D programs is the SBS (Side-By-Side) mode (see Patent Literature 1).

In the SBS mode, a broadcasting station (transmission device) transmits images each composed of a pair of a left-view image and a right-view image which are separately compressed to ½ in the horizontal direction and disposed next to each other. A receiver (digital TV receiver) capable of playing back 3D images separates the received images into left-view images and right-view images, and decompresses and alternatively plays back (displays) left-view images and right-view images.

The SBS mode involves image compression of two images (a left-view image and a right-view image) to ½ in the horizontal direction. Basically, the images can therefore be seen as 3D images only with the resolution of half HD (a resolution which is half the resolution of full HD).

One mode to realize viewing of 3D images with the resolution of full HD is to separately transmit left-images and right-view images with the resolution of full HD. According to this mode, however, transmission of two independent video streams requires a significantly wide bandwidth. One of examples of this mode is an MPEG4-MVC (Multiview Video Coding) mode (hereinafter, referred to as MVC mode). According to the MVC mode, efficient compression is performed exploiting the high correlation between right-images and left-view images for 3D playback. This enables efficient transmission of full HD 3D images within an available bandwidth. Accordingly, the MVC mode is promising for a playback mode for 3D programs.

There is a possibility that 3D programs are more and more common in digital TV broadcasting, and 3D compatible digital TV receivers for viewing 3D programs are becoming widespread in households.

CITATION LIST

Patent Literature

[Patent Literature 1] Japanese Patent No. 3789794

SUMMARY OF INVENTION

Technical Problem

However, a viewer who is viewing a 3D program sometimes does not hope 3D viewing of the program anymore. For example, there is a case where a viewer who is viewing a 3D program hopes 2D viewing of the program because of eyestrain or the like due to 3D viewing for a long period.

On the other hand, a viewer who is viewing a 2D program sometimes hopes to enjoy the program with stereoscopic images rather than planar images.

In view of this, the present invention aims to provide a reception and playback device, a transmission device, a reception and playback method, and a transmission method which enable playback of a program in a viewer's desired display mode.

Solution to Problem

In order to achieve the above aim, the present invention provides a reception and playback device comprising: an instruction reception unit configured to receive, with respect to a program that is currently played back in a first display mode, a switching instruction to switch a display mode from the first display mode to a second display mode; an informaiton reception unit configured to receive switching permission information indicating whether switching of a playback target stream of the program is permissible from a first stream corresponding to the first display mode to a second stream corresponding to the second display mode; a judgment unit configured to, when the instruction reception unit receives the switching instruction, judge whether switching of the display mode is permissible from the first display mode to the second display mode based on the switching permission information; and a playback processing unit configured to, when the judgment unit judges affirmatively, switch the playback target stream from the first stream to the second stream to perform playback using the second stream, and when the judgment unit judges negatively, perform playback using the first stream.

Advantageous Effects of Invention

With this structure, when switching of the display mode of a program is permissible from the first display mode to the second display mode, the reception and playback device switches the display mode from the first display mode to the second display mode. Accordingly, the reception and playback device can play back images of the program in a viewer's desired display mode

BRIEF DESCRIPTION OF DRAWINGS

FIG. 7 shows an example of a data structure of a program information table T100.

FIG. 8 show remote controls 250 and 250a for receiving a switching instruction in sections (a) and (b), respectively.

DESCRIPTION OF EMBODIMENTS

1. Outline

Figure 1:
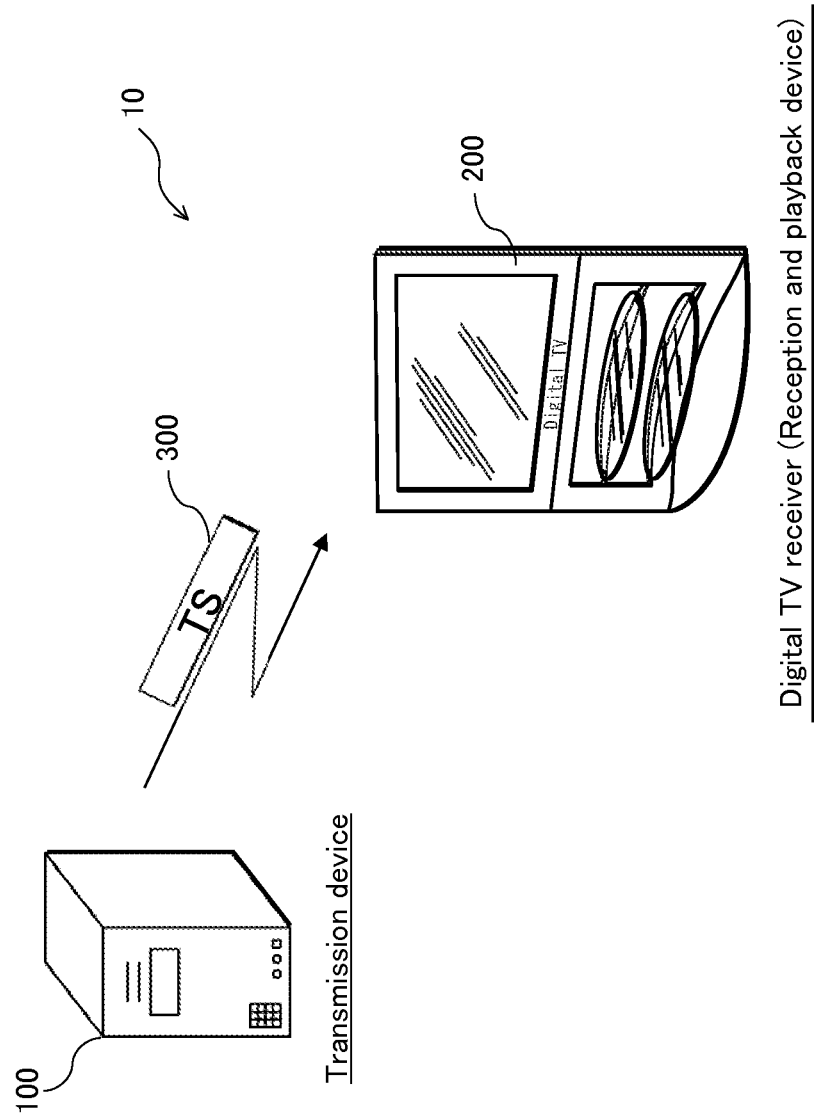
FIG. 1 shows a structure of a program distribution system 10.

As described above, there is a case where a viewer who is viewing a program in a certain display mode sometimes hopes to view the program in another display mode.

For example, assume a case where a viewer hopes to switch from viewing of 3D images of the SBS mode to viewing of 2D images. In this case, a reception and playback device such as a digital television receiver separates received images of the SBS mode into left-view images and right-view images, and doubles either of the left-view images and the right-view images (left-view images, for example) in the horizontal direction for display. However, the SBS mode involves compression of two images (a left-view image and a right-view image) to ½ in the horizontal direction, and accordingly these images have a resolution which is half the resolution of full HD. Accordingly, such a method of switching the display mode means that images with a resolution degraded as a result of enlargement are presented to the viewer. In other words, it is impossible to present 2D images with full HD to the viewer.

In view of this problem, there is a method in which a broadcasting station simulcasts a stream for 2D playback and a stream for 3D playback with respect to one program.

However, it is not advisable to permit switch the display mode without conditions just because the stream for 2D playback and the stream for 3D playback are simulcast. The reasons for this are as follows. There is a case where, with respect to one program, a scene at a certain time differs between a stream for 2D playback and a stream for 3D playback in terms of video contents (an angle of view and an angle of camera) such that 3D images have a larger punch than 2D images. For example, there is a case where 3D images are captured at viewpoints different from those of 2D images such that the 3D images are displayed stereoscopically than the 2D images. If a playback target stream is switched during such a scene that differs between the stream for 2D playback and the stream for 3D playback, a viewer might feel discomfort.

Therefore, it is necessary for the reception and playback device to control switching of the playback target stream between the stream for 2D playback and the stream for 3D playback.

As a result of earnest investigation in view of this, the inventors made the present invention.

According to one aspect of the present invention, a reception and playback device comprising: an instruction reception unit configured to receive, with respect to a program that is currently played back in a first display mode, a switching instruction to switch a display mode from the first display mode to a second display mode; an informaiton reception unit configured to receive switching permission information indicating whether switching of a playback target stream of the program is permissible from a first stream corresponding to the first display mode to a second stream corresponding to the second display mode; a judgment unit configured to, when the instruction reception unit receives the switching instruction, judge whether switching of the display mode is permissible from the first display mode to the second display mode based on the switching permission information; and a playback processing unit configured to, when the judgment unit judges affirmatively, switch the playback target stream from the first stream to the second stream to perform playback using the second stream, and when the judgment unit judges negatively, perform playback using the first stream.

2. Embodiment

The following explains in detail the present embodiment with reference to the drawings.

2.1 Outline

A program distribution system 10 relating to the present embodiment includes a transmission device (broadcasting station) 100 and a digital TV receiver (reception and playback device) 200 as shown in FIG. 1.

In digital TV broadcasting, a broadcast signal from the transmission device 100 carries video and audio streams and program organization information multiplexed into a transport stream (TS) according to the format defined by the MPEG standard. Here, the program organization information is PSI (Program Specific Information)/SI (Service Information) describing information about TS transmission network, detail information of broadcasting stations and channels (services), and detail information of broadcast programs.

The transmission device 100 transmits a TS 300 into which a video stream, an audio stream, and so on are multiplexed. In the present embodiment, the TS 300 transmitted by the transmission device (broadcasting station) 100 is a transport stream compliant with MPEG2-TS (Moving Picture Experts Group 2-Transport Stream) as in conventional 2D digital broadcasting. An MPEG2-TS compliant transport stream includes one or more video and audio streams and PSI describing to which program each video and audio stream belongs. A PSI includes a PAT (Program Association Table) which is a listing of programs included in the MPEG2-TS compliant transport stream, a PMT (Program Map Table) which is a listing of PIDs (packet IDs) of video and audio streams belonging to the respective programs.

The MPEG2-TS compliant transport stream further includes SI describing network information, service channel information, and program information.

An SI includes tables such as an NIT (Network Information Table), an SDT (Service Description Table), and an EIT (Event Information Table).

An NIT includes information relating to the networks via which the TS is transported (channel number, modulation method, and so on).

An SDT includes information relating to service channels in the TS (channel name, type of program information, digital copy control information, and so on).

An EIT includes information relating to the details of programs broadcast on each service channel (program title, broadcasting date and time, details of program content, and so on).

Broadcasting receivers such as digital TV receivers generate an EPG (Electronic Program Guide) with use of the information described in the SI.

The descriptors on each SI are used according to the standards employed in each country. The present embodiment follows the rules and standards according to the ARIB (Association of Radio Industries and Businesses) employed in Japan to suggest a method for new extension.

The reception and playback device 200 receives a TS 300 carried on a broadcast wave from a broadcasting station (transmission device 100), and separates video and audio streams multiplexed in the TS 300 from SI that includes program organization information and so on.

The reception and playback device 200 generates an EPG based on information such as PS/IS of the SI which is separated. Each piece of program information included in the EPG thus generated is associated with link information to corresponding video and audio streams. By selecting a desired program on the EPG, a user can view video of the desired program along with audio. Here, the reception and playback device 200 supports both 2D display and 3D display.

2.2 Structure of Transmission Device 100

With respect to one program, the transmission device 100 generates a video stream for 3D display (hereinafter, referred to as 3D video stream) and a video stream for 2D display (hereinafter, referred to as 2D video stream), and distributes the 3D video stream and the 2D video stream at the same time, thereby providing simulcast with respect to the one program.

Figure 2:
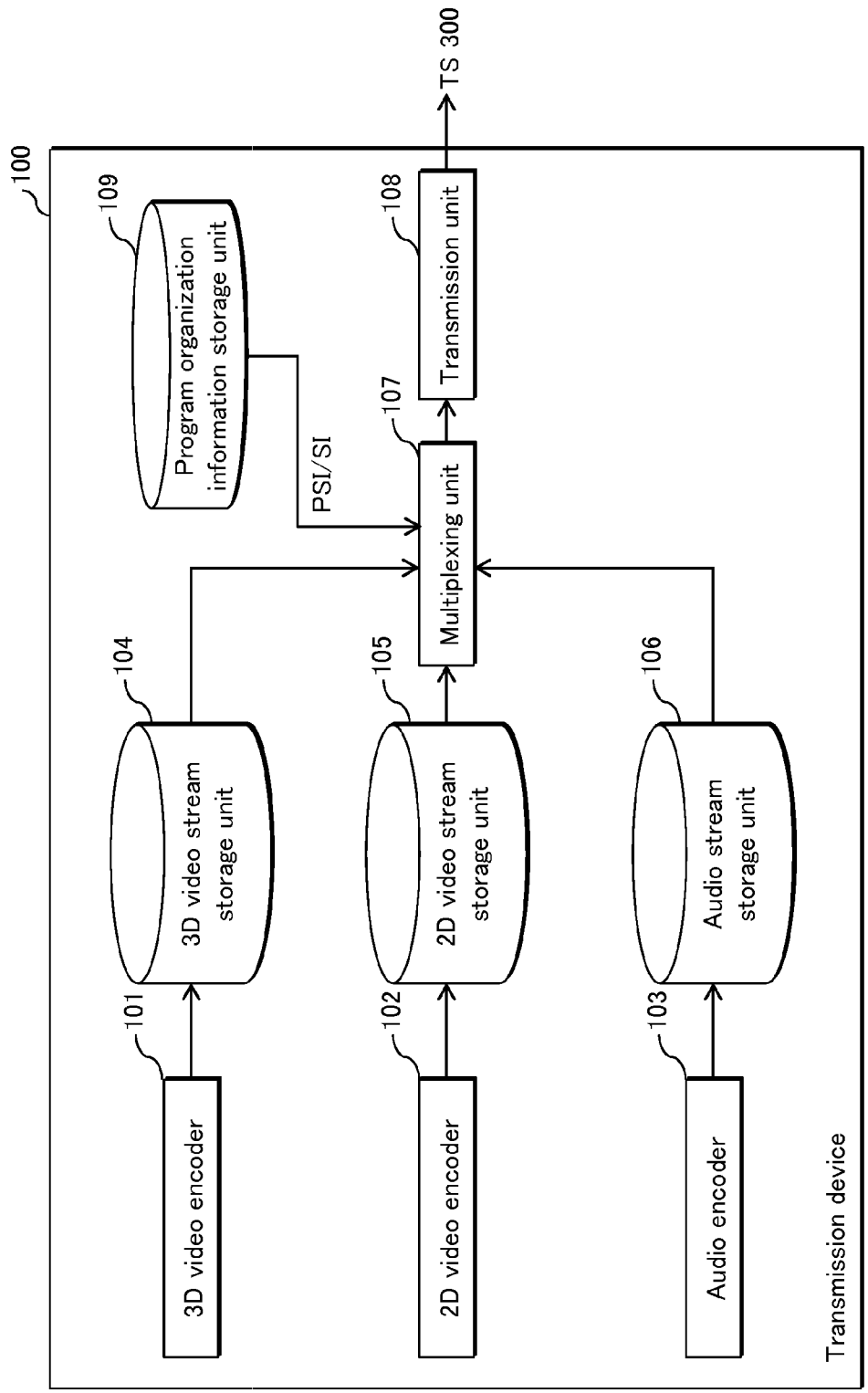
FIG. 2 is a block diagram showing a structure of a transmission device 100.

The transmission device 100 includes, as shown FIG. 2, a 3D video encoder 101, a 2D video encoder 102, an audio encoder 103, a 3D video stream storage unit 104, a 2D video stream storage unit 105, an audio stream storage unit 106, a multiplexing unit 107, a transmission unit 108, and a program organization information storage unit 109.

(1) 3D Video Encoder 101

With respect to one program, the 3D video encoder 101 encodes a plurality of images (pictures) for 3D display according to a method such as MPEG-2 and MPEG-4 to generate a 3D video stream, and writes the generated 3D video stream into the 3D video stream storage unit 104.

Here, the 3D video encoder 101 encodes 3D images according to the playback mode of the 3D images, for example, depending on whether the playback mode is the Side-by-Side (hereinafter, referred to as SBS) mode or the MPEG4-MVC (hereinafter, referred to just as MVC) mode. Note that encoding according to these modes is known, and accordingly explanation thereof is omitted here.

(2) 2D Video Encoder 102

With respect to the program, the 2D video encoder 102 encodes a plurality of images (pictures) for 2D display according to a method such as MPEG-2 and MPEG-4 to generate a 2D video stream, and writes the generated 2D video stream into the 2D video stream storage unit 105.

(3) Audio Encoder 103

The audio encoder 103 performs compression and encoding on audio data according to a method such as linear PCM to generate an audio stream, and writes the generated audio stream into the audio stream storage unit 106.

(4) 3D Video Stream Storage Unit 104

The 3D video stream storage unit 104 is a storage region for storing a 3D video stream generated by the 3D video encoder 101.

(5) 2D Video Stream Storage Unit 105

The 2D video stream storage unit 105 is a storage region for storing a 2D video stream generated by the 2D video encoder 102.

(6) Audio Stream Storage Unit 106

The audio stream storage unit 106 is a storage region for storing an audio stream generated by the audio encoder 103.

(7) Program Organization Information Storage Unit 109

The program organization information storage unit 109 is a storage region for storing PSI/SI.

Description of PSI/SI, particularly an SDT, an EIT, and a PMT is explained later. Note that PSI/SI may be generated by either of an external device or the transmission device 100.

(8) Multiplexing Unit 107

The multiplexing unit 107 multiplexes a 3D video stream stored in the 3D video stream storage unit 104, a 2D video stream stored in the 2D video stream storage unit 105, an audio stream stored in the audio stream storage unit 106, PSI/SI, and so on, to generate an MPEG2-TS compliant TS 300, and transmits the generated MPEG2-TS compliant TS 300 via the transmission unit 108.

Note that PSI/SI, which is multiplexed together with the above streams, is explained in detail later.

(9) Transmission Unit 108

The transmission unit 108 transmits an MPEG2-TS compliant TS generated by the multiplexing unit 107.

(10) PSI/SI

The following explains description of PSI/SI, particularly an SDT, an EIT, and a PMT, which are stored in the program organization information storage unit 109 and multiplexed together with the above streams by the multiplexing unit 107.

Figure 3:
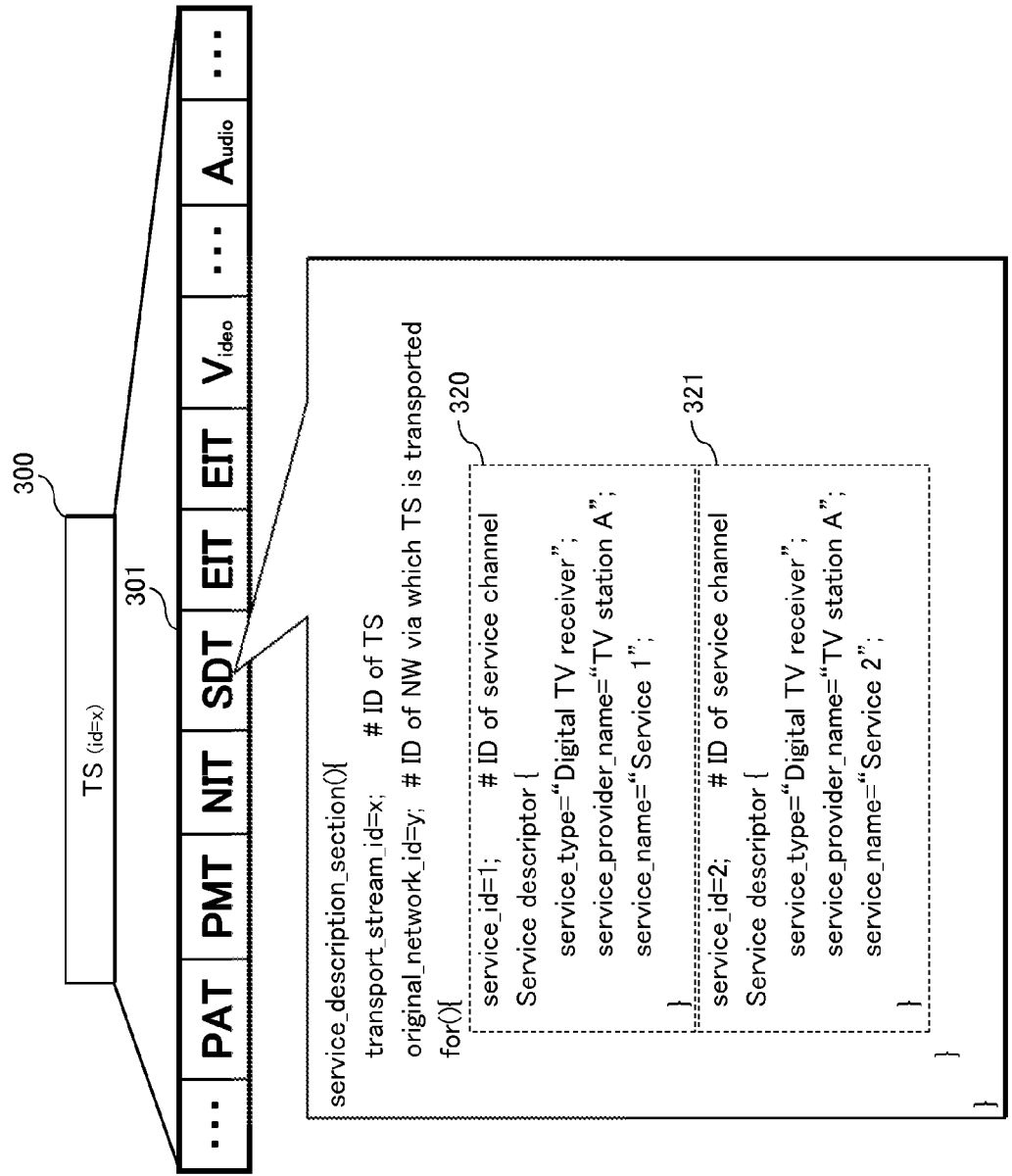
FIG. 3 shows an example of description of an SDT 301 included in a TS 300.
Figure 4:
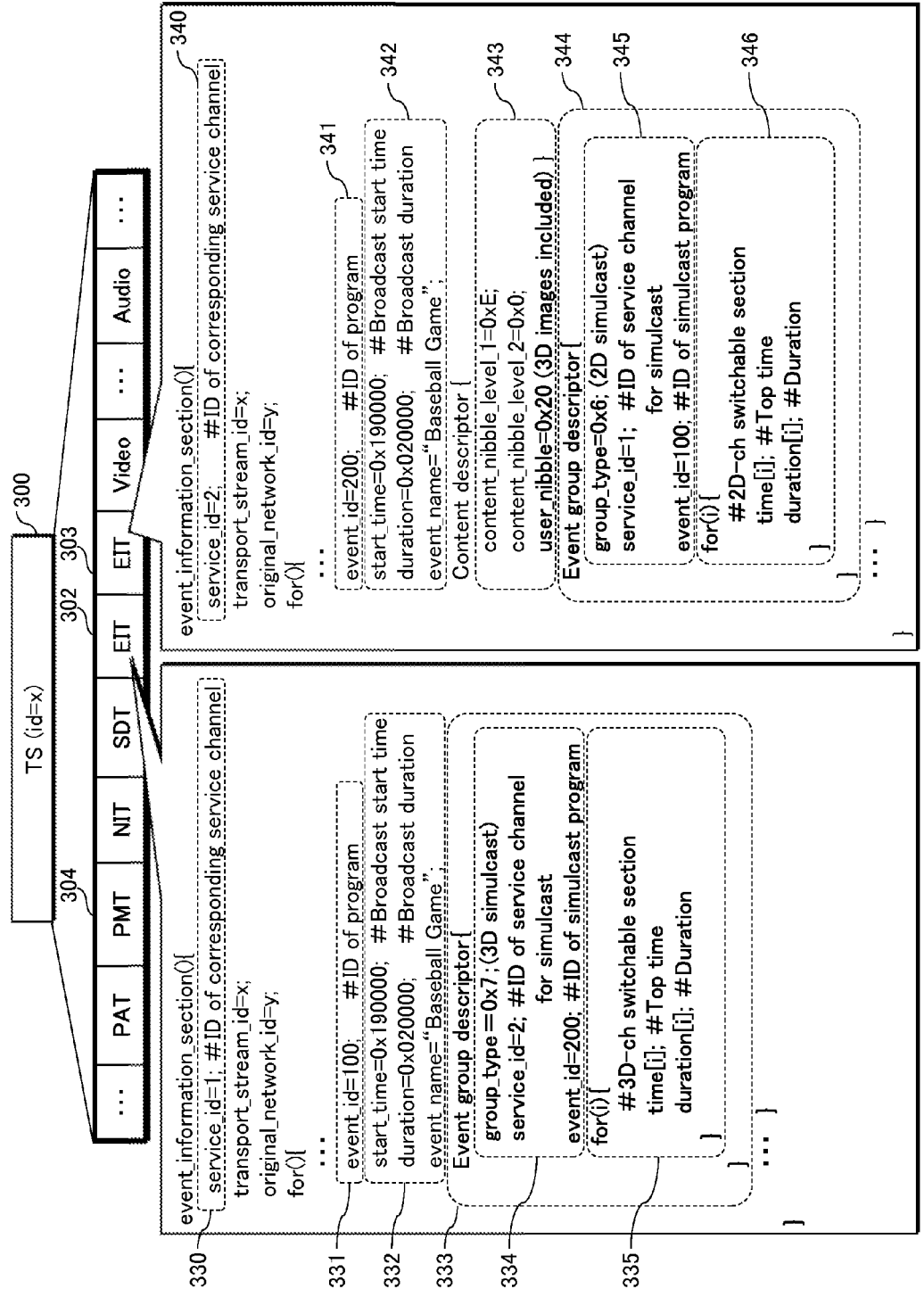
FIG. 4 shows an example of description of EITs 302 and 303 included in the TS 300.

A TS 300 generated by the multiplexing unit 107 includes, as PSI/SI, an SDT 301, an EIT 302, an EIT 303, a PMT 304, and the like as shown in FIG. 3 and FIG. 4. Programs on a plurality of service channels are multiplexed into one TS 300.

The program organization information storage unit 109 stores therein the SDT 301, the EIT 302, the EIT 303, the PMT 304, and the like which are included in a TS 300 generated by the multiplexing unit 107.

The following explains the SDT 301, the EIT 302, the EIT 303, and the PMT 304.

(10-1) SDT 301

The TS 300 shown in FIG. 3 includes two service channels, and the SDT 301 assigns a unique service_id to each service channel, and defines a separate piece of information about the service channel identified by each service_id (corresponding to descriptors 320 and 321 shown in FIG. 3).

The descriptors 320 and 321 each include, as service descriptors of a corresponding service channel, service_type indicating the broadcast mode of the service channel, service_provider_name indicating the name of the service provider, and service_name indicating the name of the service.

(10-2) EITs 302 and 303

The following explains the EITs 302 and 303 shown in FIG. 4.

The EITs 302 and 303 are each provided for each channel, and are each a collection of pieces of program information broadcast on that channel and arranged in time sequence. service_id associates the EIT with a corresponding service channel defined in the SDT 301. Here, service_id 330 associates the EIT 302 with a service channel (Service 1) indicated by the descriptor 320 shown in FIG. 3, and service_id 340 associates the EIT 303 with a service channel (Service 2) indicated by the descriptor 321 shown in FIG. 3.

Each piece of program information broadcast on a service channel is uniquely identified by event_id. For example, the service channel (Service 1) is identified by event_id 331 (having a value of 100) in the EIT 302, and the service channel (Service 2) is identified by event_id 341 (having a value of 200) in the EIT 303.

The time at which each program starts is described by "start time", and the time period during which the program lasts is described by "duration". Both the respective programs indicated in the EITs 302 and 303 shown in FIG. 4 start at 19:00, and lasts for two hours. Also, the program title of each program is described by "event_name". Both the respective programs indicated in the EITs 302 and 303 shown in FIG. 4 have the same program title.

The descriptor relating to detail information of each program is described in each of the EITs 302 and 303 for each "event_id". Specifically, the program information for the program indicated in the EIT 303 includes a content descriptor 343 indicating "3D images included". As the content descriptor 343, information relating to the genre of an event is described. For example, by defining "content_nibble_level_1", "content_nibble_level_2", and "user_nibble", information relating to the genre of an event is identified. Here, the definition of these pieces of information is expanded, and these pieces of information are described as "content_nibble_level_1=0×E", "content_nibble_level_2=0×0", and "user_nibble=0×20", respectively. As a result, the program indicated in the EIT 303, namely, the program identified by event_id=200 includes 3D images.

The respective programs indicated in the EITs 302 and 303 are the same program in terms of content. However, while the program (stream) indicated in the EIT 302 is broadcast as a 2D program, the program (stream) indicated in the EIT 303 is broadcast as a 3D program. That is, the two programs are broadcast as a pair of simulcast programs which differ from each other in terms of viewing mode, specifically, a simulcast pair of a program displayed in a display mode using 2D images and a program displayed in a display mode using 3D images.

The EITs 302 and 303 include, as information associating programs that are simulcast with each other, event group descriptors 333 and 344 respectively that are each information indicating a program (stream) of a simulcast pair of 2D and 3D programs.

The conventional event group descriptor is a descriptor compliant with the ARIB standard (ARIB STD-B10) in the current 2D broadcasting. In one example, the event group descriptor is used to group a plurality of programs (events) related to one another by describing the PID which refers to the same ES in the PMTs of the related events to establish sharing of the same event among multiple services (event sharing). In another example, the event group descriptor is used to define a broadcast mode in which one program is switched to another service at some midpoint in the program for continuous viewing (event relay). Here, through expansion of this descriptor, a new descriptor associating 2D and 3D simulcast programs with each other is duly defined to provide a link therebetween.

The event group descriptor 333 includes an identification information descriptor 334 identifying a video stream of a simulcast 3D program, namely, a 3D video stream included in the TS 300 and a switching information descriptor 335 indicating whether switching to the 3D video stream is permissible.

Also, the event group descriptor 344 includes an identification information descriptor 345 identifying a video stream of a simulcast 2D program, namely, a 2D video stream included in the TS 300 and a switching information descriptor 346 indicating whether switching to the 2D video stream is permissible.

The identification information descriptors 334 and 345 each define the group type (group_type) identifying either of a 2D simulcast program or a 3D simulcast program, a channel ID (sevice_id) identifying the service channel of the identified simulcast program which is a reference destination, and the program ID (event_id) of the identified simulcast program which is the reference destination.

Note that group_type has a value identifying the service mode of the data structure to be provided. Here, group_type has a value "0×6" corresponding to a simulcast 2D program and a value "0×7" corresponding to a simulcast 3D program.

Accordingly, the event group descriptors 333 and 344 are rendered usable as link information for transition to the other program that is simulcast.

The switching information descriptors 335 and 346 each describe at least one piece of switchable section information indicating a switchable section of a video stream indicated by a corresponding EIT. As switchable section information, a pair of time[i] and duration[i] is defined. Specifically, time[i] indicates a top time of the switchable section, and duration[i] indicates a duration of the switchable section. Here, i is an integer which is equal to or greater than 0 and equal to or less than n−1. Also, n is an integer which is equal to or greater than 1, and indicates the number of switchable sections.

(10-3) PMT 304

The PMT 304 includes information (ES information) relating to each of a 2D video stream for a 2D program identified by event_id=100, a 3D video stream for a 3D program identified by event_id=200, and respective audio streams for the 2D and 3D programs. The description of the PMT 304 is the same as conventional ones, excepting that ES information relating to a 3D program includes information indicating whether the playback mode of 3D images is the SBS mode or the MVC mode (3D playback mode) in addition to conventional description.

2.3 Reception and Playback Device 200

The reception and playback device 200 is a digital TV receiver that is not compatible with 3D display. The reception and playback device 200 receives a TS 300 transmitted from the transmission device 100, and generates images for 2D display from a video stream included in the TS 300.

Figure 5:
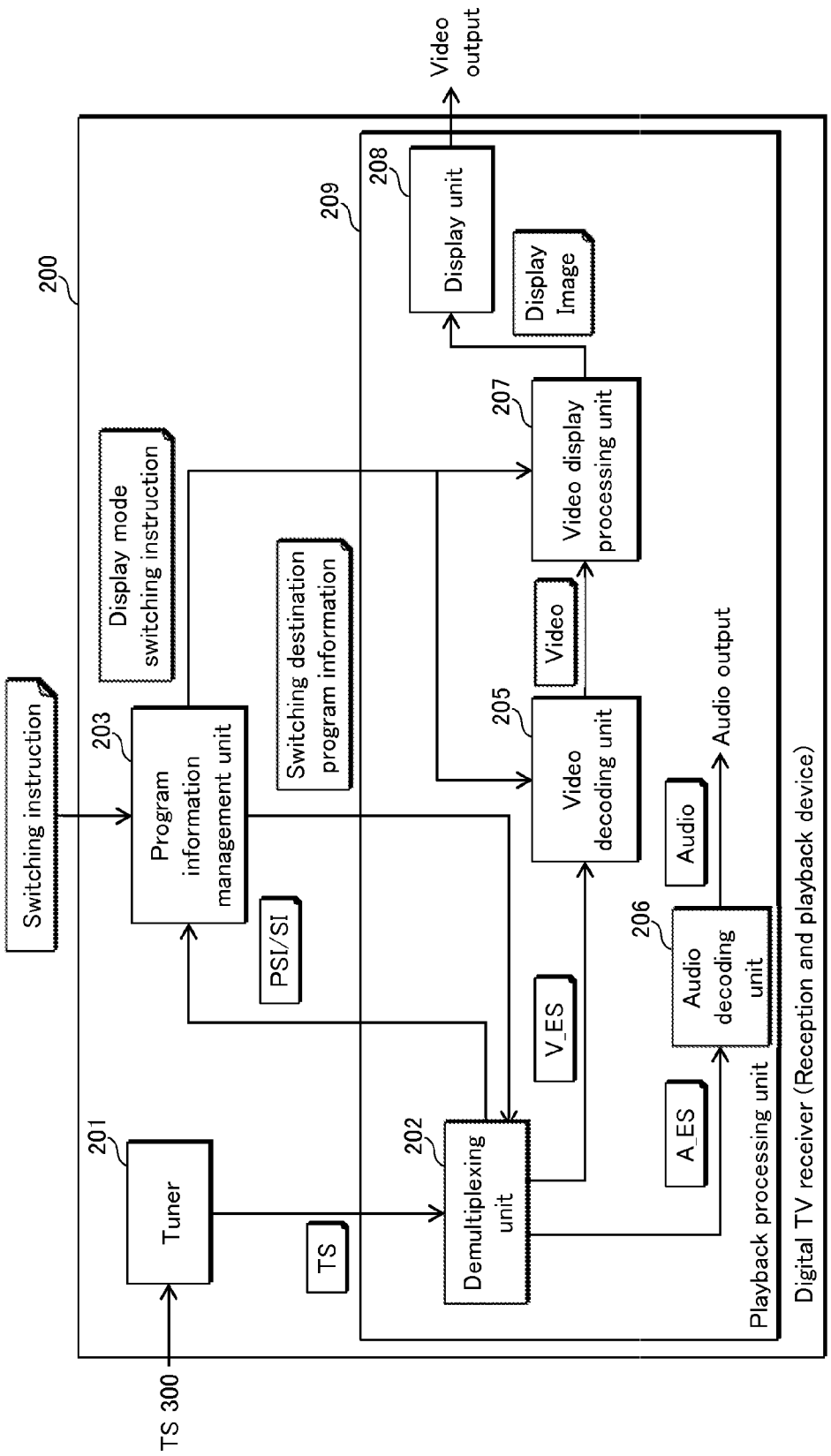
FIG. 5 is a block diagram showing a structure of a digital TV receiver (reception and playback device) 200.

The reception playback device 200 includes, as shown in FIG. 5, a tuner 201, a demultiplexing unit 202, a program information management unit 203, a video decoding unit 205, an audio decoding unit 206, a video display processing unit 207, and a display unit 208.

Here, the demultiplexing unit 202, the video decoding unit 205, the audio decoding unit 206, the video display processing unit 207, and the display unit 208 constitute a playback processing unit 209 that performs playback processing of a program designated by a user.

(1) Tuner 201

The tuner 201 has a function of receiving a signal of a TS 300 carried on a digital broadcast wave which is transmitted from the transmission device 100, and demodulating the received signal.

(2) Demultiplexing Unit 202

The demultiplexing unit 202 demultiplexes the received TS 300 into a video stream (V_ES) an audio stream (A_ES), PSI/SI, and so on, and outputs the video stream, the audio stream, and the PSI/SI to the video decoding unit 1106, the audio decoding unit 206, and the program information management unit 203, respectively.

The video stream to be output to the video decoding unit 205 is selected from among one or more video streams included in the received TS 300, in accordance with stream information such as a PID of a video stream which is associated with a program selected by the program information management unit 203, which is described later. Note that the video stream includes video codec information and also includes 3D mode information if the video stream is a 3D video stream. Such information is also transferred to the video decoding unit 205. The video codec information indicates a codec method of the video stream. For example, the video codec information indicates either of the MPEG-2 method or the MPEG-4 method. Also, the 3D mode information indicates whether the 3D images are generated by the SBS mode or the MVC mode.

The audio stream to be output to the audio decoding unit 206 is selected from among one or more audio streams included in the received TS 300, in accordance with stream information such as a PID of an audio stream which is associated with a program selected by the program information management unit 203, which is described later.

The demultiplexing unit 202 extracts system packets such as PSI, SI, and a PMT from the received TS 300, acquires program information and stream information corresponding to the program from the received TS 300, and outputs the acquired program information and stream information to the program information management unit 203.

(3) Program Information Management Unit 203

The program information management unit 203 associates the program information and the stream information, which are received from the demultiplexing unit 202, with each other for management in a database. Upon receiving a display mode switching instruction to switch the display mode (viewing mode) from the user, the program information management unit 203 judges whether switching is permissible.

Figure 6:
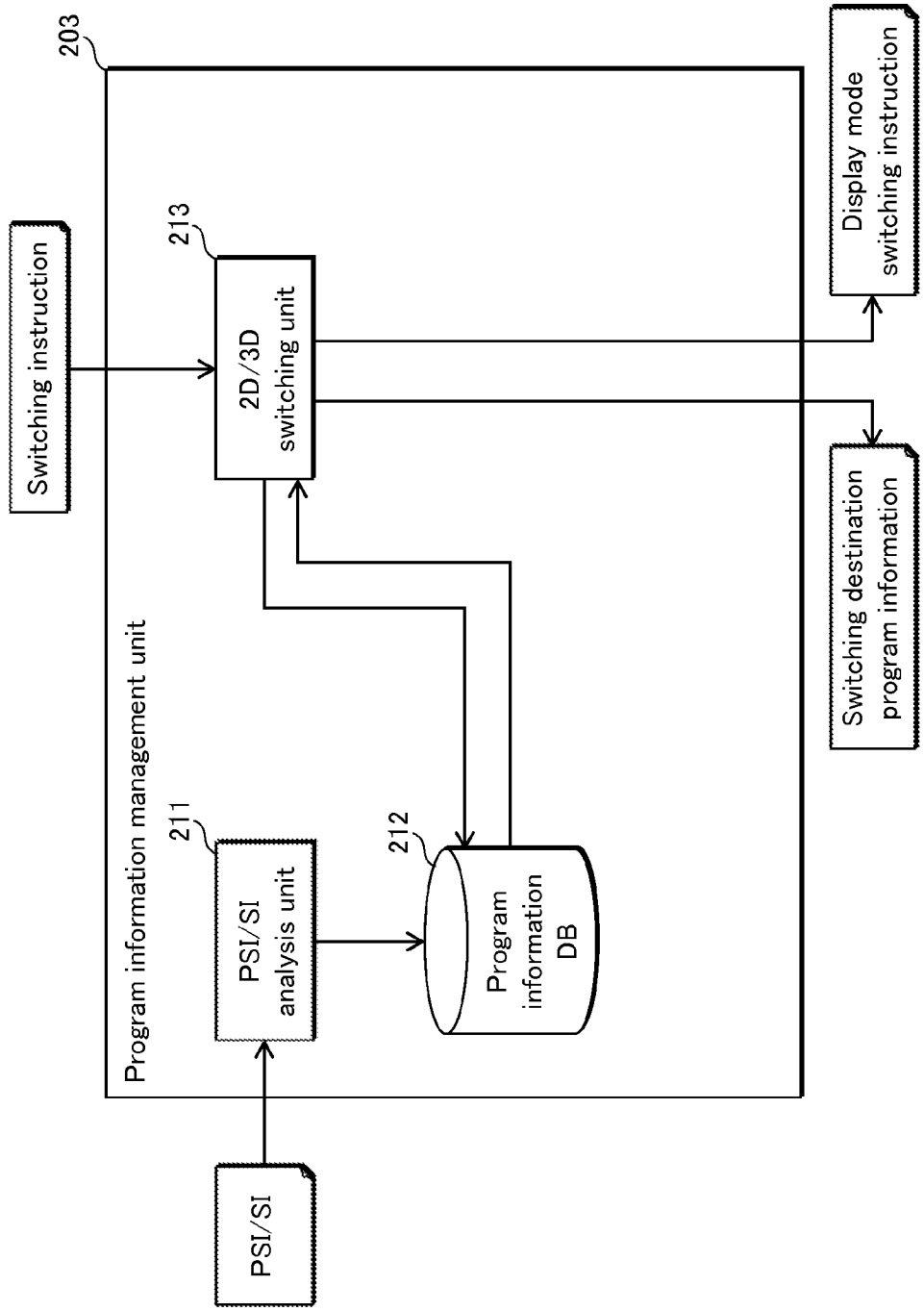
FIG. 6 is a block diagram showing a structure of a program information management unit 203.

As shown in FIG. 6, the program information management unit 203 includes a PSI/SI analysis unit 211, a program information DB 212, and a 2D/3D switching unit 213.

(3-1) PSI/SI Analysis Unit 211

Upon receiving PSI/SI from the demultiplexing unit 202, the PSI/SI analysis unit 211 extracts program information from the received PSI/SI, and stores the extracted program information in the program information DB 212.

For example, a PMT of PSI/SI includes PID information of a stream included in a TS and a playback mode if the stream identified by the PID information is a 3D video stream. Similarly, an SDT of PSI/SI describes service channel information of a service channel that is broadcast, and an EIT describes pieces of program information each associated with a corresponding channel. The PSI/SI analysis unit 211 acquires the information for each program from PSI/SI, and stores each piece of program information together with a corresponding piece of stream information in the program information DB 212.

(3-2) Program Information DB 212

The program information DB 212 manages pieces of program information for each program and stream information, which are acquired by the PSI/SI analysis unit 211, in the database, and supplies a relevant piece of data at a request for program information.

For example, the program information DB 212 includes a program information table T100 shown in FIG. 7. The program information table T 100 has a region for storing at least one combination composed of fields "Channel ID", "Channel name", "Program ID", "Program title", "Date/Time", "3D images", "3D playback mode", "Switching destination information", and "Stream ID".

The field "Channel ID" describes an identifier indicating a channel on which a corresponding program is broadcasted, and the field "Channel name" describes a name of a broadcasting station of the channel. The field "Program ID" describes an identifier indicating the corresponding program, and the field "Program title" describes a title of the corresponding program. The field "Date/Time" describes date and time when the corresponding program is broadcasted. All these pieces of information are acquired from the EIT and the SDT.

The field "3D images" describes information as to whether the corresponding program includes 3D images. For purposes of description, in FIG. 7, the field "3D images" describes "−" if the corresponding program does not include 3D images, and describes "Included" if the corresponding program includes 3D images.

The field "3D playback mode" describes information identifying a playback mode if the corresponding program includes 3D images. For example, in the case where the playback mode of the 3D images is the SBS mode, information indicating the SBS mode ("SBS") is described. In the case where the playback mode of the 3D images is the MVC mode, information indicating the MVC mode ("MVC") is described. Such information is acquired from a PMT.

The field "Switching destination information" includes subfields "Simulcast" and "Switchable section information". The subfield "Simulcast" describes information indicating whether a corresponding program is simulcast, and identification information identifying the other program that is simulcast if the corresponding program is simulcast. For example, in the case where the corresponding program is simulcast, the subfield "Simulcast" describes information indicating that the corresponding program is simulcast ("Yes"). This information is determined based on whether the EIT describes an identification information descriptor associating the other program that is simulcast, which is included in an event group descriptor. In the case where the corresponding program is simulcast, an identification information descriptor associating the other program that is simulcast is described as identification information identifying a switching destination. In the case where the corresponding program is simulcast, the subfield "Switchable section information" describes at least one piece of information indicating a switchable section, which is each described in a switching information descriptor. That is, the subfield "Switchable section information" describes one or more pairs of time[i] indicating a top time of a switchable section and duration[i] indicating a duration of the switchable section. Here, i is an integer which is equal to or greater than 0 and equal to or less than n−1. Also, n is an integer which is equal to or greater than 1, and indicates the number of switchable sections.

The field "Stream ID" describes a stream ID allocated to the corresponding program ("transport_stream_id" described in the EIT).

In the following explanation, program information of each program (a 2D program and a 3D program) includes information described in the fields "Channel ID", "Channel name", "Program ID", "Program title", "Date/Time", "3D images", "3D playback mode", "Switching destination information" (the subfields "Simulcast" and "Switchable section information"), and "Stream ID" which are stored in the program information table T100.

(3-3) 2D/3D Switching Unit 213

Upon receiving a switching instruction to switch a broadcast mode of a program that is currently viewed by a user, specifically, a switching instruction to switch from the 2D broadcast mode to the 3D broadcast mode or from the 3D broadcast mode to the 2D broadcast mode, the 2D/3D switching unit 213 inquires of the program information DB 212 as to program information of the program that is currently played back. For example, the 2D/3D switching unit 213 receives a switching instruction via buttons 251 and/or 252 of a remote control 250 shown in part (a) of FIG. 8. When the user presses the button 251 while viewing 2D images, a switching instruction is transmitted to the 2D/3D switching unit 213 which instructs to switch the 2D images of the program the user is currently viewing to 3D images. The 2D/3D switching unit 213 receives the switching instruction. Also, when the user presses the button 252 while viewing 3D images, a switching instruction is transmitted to the 2D/3D switching unit 213 which instructs to switch the 3D images of the program the user is currently viewing to 2D images. The 2D/3D switching unit 213 receives the switching instruction. Alternatively, as shown in part (b) of FIG. 8, a remote control 250a may include a single button 251a as an image switching button. When the user presses the button 251a, a switching instruction is transmitted which instructs to switch from the 2D display mode to the 3D display mode or from the 3D display mode to the 2D display mode, depending on the display mode at a time when the button 251a has been pressed. Further alternatively, without providing a physical switching button in a remote control, a setting screen of a digital television receiver such as an EPG screen may be configured such that a user can select 2D viewing or 3D viewing on the setting screen.

The 2D/3D switching unit 213 analyzes the program information acquired from the program information DB 212 to check whether a program is simulcast with the program which is currently played back. When judging that there is a simulcast program of the user's desired broadcast mode (2D broadcast mode or 3D broadcast mode), the 2D/3D switching unit 213 judges whether switching to a video stream that is a switching destination at the current time is permissible, with use of information described in the field "Switchable section information" included in the acquired program information. When judging that switching is permissible, the 2D/3D switching unit 213 outputs identification information of the switching destination (for example, service_id and event_id of the switching destination) to the demultiplexing unit 202. Furthermore, the 2D/3D switching unit 213 outputs a display mode switching instruction to the video decoding unit 205 and the video display processing unit 207. When receiving a display mode switching instruction to switch from the 2D display mode to the 3D display mode, the 2D/3D switching unit 213 judges whether 2D images the user is currently viewing are images of a 2D program (images of a 2D video stream) or images of a 3D program which are displayed in the 2D display mode, based on analysis results of the program information acquired from the program information DB 212. This judgment is made prior to checking as to whether there is a simulcast program. When judging that the 2D images the user is currently viewing are images of a 2D program, the 2D/3D switching unit 213 checks as to whether there is a simulcast program, which is explained above. When judging that the 2D images the user is currently viewing are images of a 3D program, the 2D/3D switching unit 213 outputs a 3D playback instruction to the video display processing unit 207 which instructs to perform 3D playback using a video stream that is the current playback target stream (3D video stream), irrespective of checking results as to whether there is a simulcast program.

When judging that there is no program of the user's desired broadcast mode (2D broadcast mode or 3D broadcast mode) that is simulcast with the program which is currently played back, or when there is a simulcast program and but switching is impermissible, the 2D/3D switching unit 213 outputs a display mode switching instruction with respect to the program which is currently broadcast to the video decoding unit 205 and the video display processing unit 207. For example, assume that the 2D/3D switching unit 213 receives a switching instruction to switch from 3D playback to 2D playback, and judges that there is no simulcast program. In the case where the current 3D playback mode is a mode compatible with 2D playback such as the MVC mode, the 2D/3D switching unit 213 outputs a first instruction to the video decoding unit 205 which is explained later. The first instruction instructs to decode only a base view stream multiplexed in an MPEG4-AVC video stream as a 2D compatible MPEG4-AVC video stream. On the other hand, in the case where the current 3D playback mode is the SBS mode, the 2D/3D switching unit 213 outputs a second instruction to the video display processing unit 207 which is explained later. The second instruction instructs to crop either left-view image parts or right-view image parts included in frames, and scale the cropped image parts to be as large as the entire screen to output 2D images.

Furthermore, when receiving a switching instruction to switch from 2D playback to 3D playback and judging that switching is impermissible, the 2D/3D switching unit 213 outputs a third instruction to the video display processing unit 207. The third instruction instructs to perform playback for 3D display using 2D images.

In this way, the 2D/3D switching unit 213 realizes switching between 2D playback and 3D playback of a program which is viewed in the digital television receiver 200.

(4) Video Decoding Unit 205

The video decoding unit 205 decodes a 2D video stream and a 3D video stream.

Regarding decoding of a 3D video stream, the video decoding unit 205 has a function of decoding a video stream (V_ES) upon receipt from the demultiplexing unit 202 and also has a function of retrieving the video codec information and 3D mode information from the video stream. The video decoding unit 205 decodes the video stream into frames. In the case where the "3D mode information" indicates the SBS mode, the video stream is composed of frames each of which is composed of a 3D pair of a left-view image and a right-view image. In this case, the video decoding unit 205 decodes the video stream into frames as 2D frames. In other words, the decoded frames are each a video composed of a pair of a left-view image and a right-view image. On the other hand, in the case where the "3D mode information" indicates the MVC mode, the video decoding unit 205 decodes both a base view stream and a non-base view stream to perform playback for 3D display. Upon receiving a first instruction from the 2D/3D switching unit 213, the video decoding unit 205 decodes only the base view stream as a 2D compatible MPEG4-AVC stream.

Also, the video decoding unit 205 decodes a 2D video stream to play back a 2D program.

The video decoding unit 205 outputs decoded frames to the video display processing unit 207. Here, in the case where the decoded frames are included in a 3D video stream, the video decoding unit 205 outputs 3D mode information to the video display processing unit 207 together with the decoded frames.

Also, upon receiving a display mode switching instruction from the 2D/3D switching unit 213, the video decoding unit 205 switches a decoding target stream between a 2D video stream and a 3D video stream.

(5) Audio Decoding Unit 206

The audio decoding unit 206 decodes an audio stream (A_ES) received from the demultiplexing unit 202 to generate audio data, and outputs the generated audio data as audio.

(6) Video Display Processing Unit 207

The video display processing unit 207 processes frames, which are received from the video decoding unit 205, and outputs a display image after the process to the display unit 208. Examples of the processes conducted are cropping and scaling.

In the case where 3D display is performed and the 3D mode information indicates the SBS mode, the video display processing unit 207 separates frames received from the video decoding unit 205 into left-view image parts and right-view image parts, and scales the respective separated image parts to be as large as the entire screen to generate left-view images and right-view images. Then, the video display processing unit 207 processes the generated left-view images and right-view images, and alternately outputs the processed left-view images and right-view images to the display unit 208.

Also, in the case where 3D display is performed and the 3D mode information indicates the MVC mode, the video display processing unit 207 processes frames received from the video decoding unit 205, and alternately outputs processed left-view images and right-view images to the display unit 208.

In the case where 2D display is performed, the video display processing unit 207 processes frames received from the video decoding unit 205, and outputs processed images to the display unit 208.

In addition, when receiving a second instruction from the 2D/3D switching unit 213, the video display processing unit 207 crops only left-view image parts from frames received from the video decoding unit 205, and scales the cropped left-view image parts to be as large as the entire screen to generate 2D images. Then, the video display processing unit 207 processes the generated 2D images, and outputs the processed 2D images to the display unit 208. Note that image parts to be cropped may be right-view image parts.

When receiving a third instruction from the 2D/3D switching unit 213, the video display processing unit 207 converts the display mode of input 2D images from the 2D display mode to the 3D display mode to generate 3D images (left-view images and right-view images), and alternately outputs the generated left-view images and right-view images to the display unit 208.

Furthermore, when receiving a 3D playback instruction from the 2D/3D switching unit 213, the video display processing unit 207 outputs 3D images in a playback mode indicated by the 3D mode information using a video stream that is the current playback target stream (3D video stream).

(7) Display Unit 208

The display unit 208 displays, on the screen, the frames after the processes received from the video display processing unit 207.

2.4 Operations (1) Operations of Transmission Device 100

Figure 9:
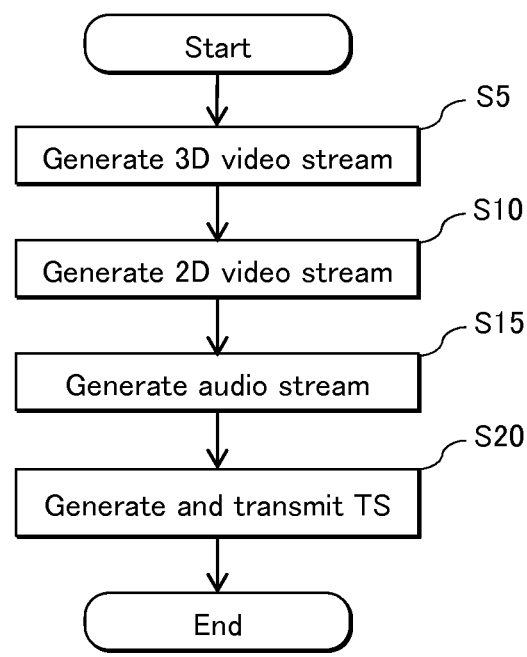
FIG. 9 is a flow chart showing operations of the transmission device 100.

Here, the operations of the transmission device 100 are explained with reference to a flow chart shown in FIG. 9.

The 3D video encoder 101 encodes a plurality of videos (pictures) for 3D display with respect to a program according to a method such as MPEG-2 and MPEG-4 to generate a 3D video stream, and writes the generated 3D video stream into the 3D video stream storage unit 104 (Step S5). The 3D video encoder 101 encodes each program according to either of the SBS mode or the MVC mode which is determined advance for the program.

The 2D video encoder 102 encodes a plurality of videos (pictures) for 2D display with respect to the program according to a method such as MPEG-2 and MPEG-4 to generate a 2D video stream, and writes the generated 2D video stream into the 2D video stream storage unit 105 (Step S10).

The audio encoder 103 performs compression and encoding on audio data to generate an audio stream, and writes the generated audio stream into the audio stream storage unit 106 (Step S15).

The multiplexing unit 107 multiplexes the 3D video stream, the 2D video stream, the audio stream, and the PSI/SI and the like stored in the program organization information storage unit 109 to generate an MPEG2-TS compliant transport stream, and transmits the generated MPEG2-TS compliant transport stream via the transmission unit 108 (Step S20).

(2) Operations of Reception and playback Device 200

Here, the operations of the reception and playback device 200 are explained with reference to a flow chart shown in FIG. 10.

When receiving a switching instruction via a user's operation (Step S100), the 2D/3D switching unit 213 included in the program information management unit 203 judges whether a switching destination is a 2D program or a 3D program (Step S105).

When judging that the switching destination is a 2D program (Step S105: 2D), the 2D/3D switching unit 213 judges whether a 2D program is simulcast with a program that is currently viewed (Step S110). Specifically, the 2D/3D switching unit 213 makes this judgment based on whether the field "Simulcast" included in program information of the program that is currently viewed describes "Included" or "Not included".

When judging that there is a 2D simulcast program (Step S110: Yes), the 2D/3D switching unit 213 judges whether switching from the 3D program to the 2D program at the current time is permissible (Step S115). Specifically, the 2D/3D switching unit 213 judges whether the current time belongs to any one of one or more switchable sections described in the field "Switchable section information" included in program information of the program which is currently viewed, with use of the program information table T100.

When the 2D/3D switching unit 213 judges that switching is permissible (Step S115: Yes), the playback processing unit 209 switches a playback target stream from a 3D video stream to a 2D video stream, and plays back the 2D program (Step S120). Specifically, the 2D/3D switching unit 213 firstly outputs a display mode switching instruction to the video decoding unit 205 and the video display processing unit 207 included in the playback processing unit 209, and also outputs switching destination program information to the demultiplexing unit 202. Upon receiving the switching destination program information, the demultiplexing unit 202 included in the playback processing unit 209 extracts a 2D video stream and an audio stream which are identified by the switching destination program information from the TS 300, and then outputs the 2D video stream and the audio stream to the video decoding unit 205 and the audio decoding unit 206, respectively. Upon receiving the display mode switching instruction, the video decoding unit 205 switches the decoding mode from the 3D decoding mode to the 2D decoding mode, and decodes the 2D video stream in the 2D decoding mode. Upon receiving the display mode switching instruction, the video display processing unit 207 switches the output mode for outputting images to the display unit 208 from a 3D output mode to a 2D output mode, and outputs images of the 2D video stream decoded by the video decoding unit 205 to the display unit 208 in the 2D output mode. Here, the 3D output mode is a mode for alternately outputting left-view images and right-view images at intervals of 1/120 seconds, and the 2D output mode is a mode for outputting 2D images at intervals of 1/60 seconds.

When judging that there is no 2D simulcast program (Step S110: No), or when judging that switching to the 2D program is impermissible (Step S115: No), the 2D/3D switching unit 213 judges as to the 3D playback mode of the 3D program, that is, judges whether the 3D playback mode is the SBS mode or the MVC mode (Step S125). Specifically, the 2D/3D switching unit 213 makes this judgment based on information described in the field "3D playback mode" included in program information of the program which is currently viewed.

When the 2D/3D switching unit 213 judges that the 3D playback mode of the 3D program is the MVC mode, (Step S125: MVC), the playback processing unit 209 plays back base view images included in the 3D video stream as 2D images (Step S130). Specifically, the 2D/3D switching unit 213 firstly outputs a first instruction to the video display processing unit 207 included in the playback processing unit 209. The demultiplexing unit 202 included in the playback processing unit 209 extracts the 3D video stream and the audio stream from the TS 300, and outputs the 3D video stream and the audio stream to the video decoding unit 205 and the audio decoding unit 206, respectively. The video decoding unit 205 decodes the 3D video stream of the MVC mode. Upon receiving the first instruction from the 2D/3D switching unit 213, the video display processing unit 207 outputs base view images included in the 3D video stream decoded by the video decoding unit 205 to the display unit 208.

When the 2D/3D switching unit 213 judges that the 3D playback mode of the 3D program is the SBS mode (Step S125: SBS), the playback processing unit 209 crops left-view image parts from side-by-side frames included in the 3D video stream, and plays back the cropped left-view image parts as 2D images (Step S135). Specifically, the 2D/3D switching unit 213 firstly outputs a second instruction to the video display processing unit 207 included in the playback processing unit 209. The demultiplexing unit 202 included in the playback processing unit 209 extracts the 3D video stream and the audio stream from the TS 300, and outputs the 3D video stream and the audio stream to the video decoding unit 205 and the audio decoding unit 206, respectively. The video decoding unit 205 decodes the 3D video stream of the SBS mode. Upon receiving the second instruction from the 2D/3D switching unit 213, the video display processing unit 207 crops only left-view image parts from the frames decoded by the video decoding unit 205, and scales the cropped left-view image parts to be as large as the entire screen to generate 2D images, and outputs the generated 2D images to the display unit 208.

When judging that the switching destination is a 3D program (Step S105: 3D), the 2D/3D switching unit 213 judges whether 2D images which are currently viewed are images of the 2D program or images of the 3D program (Step S110).

When judging that the 2D images which are currently viewed are images of the 2D program, the 2D/3D switching unit 213 judges whether a 3D program is simulcast with the program which is currently viewed (Step S140). Specifically, the 2D/3D switching unit 213 makes this judgment based on whether the field "Simulcast" included in program information of the program that is currently viewed describes "Included" or "Not included".

When judging that there is a 3D simulcast program (Step S140: Yes), the 2D/3D switching unit 213 judges whether switching from the 2D program to the 3D program at the current time is permissible (Step S145). Specifically, the 2D/3D switching unit 213 judges whether the current time belongs any one of one or more of switchable sections described in the field "Switchable section information" included in the program information of the program which is currently viewed.

When the 2D/3D switching unit 213 judges that switching is permissible (Step S145: Yes), the playback processing unit 209 switches the playback target stream from a 2D video stream to a 3D video stream, and plays back the 3D program (Step S150). Specifically, the 2D/3D switching unit 213 outputs a display mode switching instruction to the video decoding unit 205 and the video display processing unit 207 included in the playback processing unit 209, and also outputs switching destination program information to the demultiplexing unit 202. Upon receiving the switching destination program information, the demultiplexing unit 202 included in the playback processing unit 209 extracts a 3D video stream and an audio stream which are identified by the switching destination program information from the TS 300, and then outputs the 3D video stream and the audio stream to the video decoding unit 205 and the audio decoding unit 206, respectively. Upon receiving the display mode switching instruction, the video decoding unit 205 switches the decoding mode from the 2D decoding mode to the 3D decoding mode, and decodes the 3D video stream in the 3D decoding mode. Upon receiving the display mode switching instruction, the video display processing unit 207 switches the output mode for outputting images to the display unit 208 from the 2D output mode to the 3D output mode, and outputs images of the 3D video stream decoded by the video decoding unit 205 to the display unit 208 in the 3D output mode.

When the 2D/3D switching unit 213 judges that there is no 3D simulcast program (Step S140: No), or when the 2D/3D switching unit 213 judges that switching to the 3D program is impermissible (Step S145: No), the playback processing unit 209 performs 3D playback using the 2D video stream (Step S155). Specifically, the 2D/3D switching unit 213 firstly outputs a third instruction to the video display processing unit 207. The demultiplexing unit 202 included in the playback processing unit 209 extracts the 2D video stream and the audio stream from the TS 300, and outputs the 2D video stream and the audio stream to the video decoding unit 205 and the audio decoding unit 206, respectively. The video decoding unit 205 decodes the 2D video stream. Upon receiving the third instruction from the 2D/3D switching unit 213, the video display processing unit 207 switches the output mode from the 2D output mode to the 3D output mode. Then, the video display processing unit 207 generates 3D images (left-view images and right-view images) from 2D images decoded by the video decoding unit 205, and alternately outputs the generated left-view images and right-view images to the display unit 208.

When the 2D/3D switching unit 213 judge that the images are images of the 2D program (Step S138: 3D program), the video display processing unit 207 performs 3D playback using the video stream which is the current playback target stream (3D video stream) (Step S160).

2.5 Specific Examples (1) Program Information of Program

Figure 11:
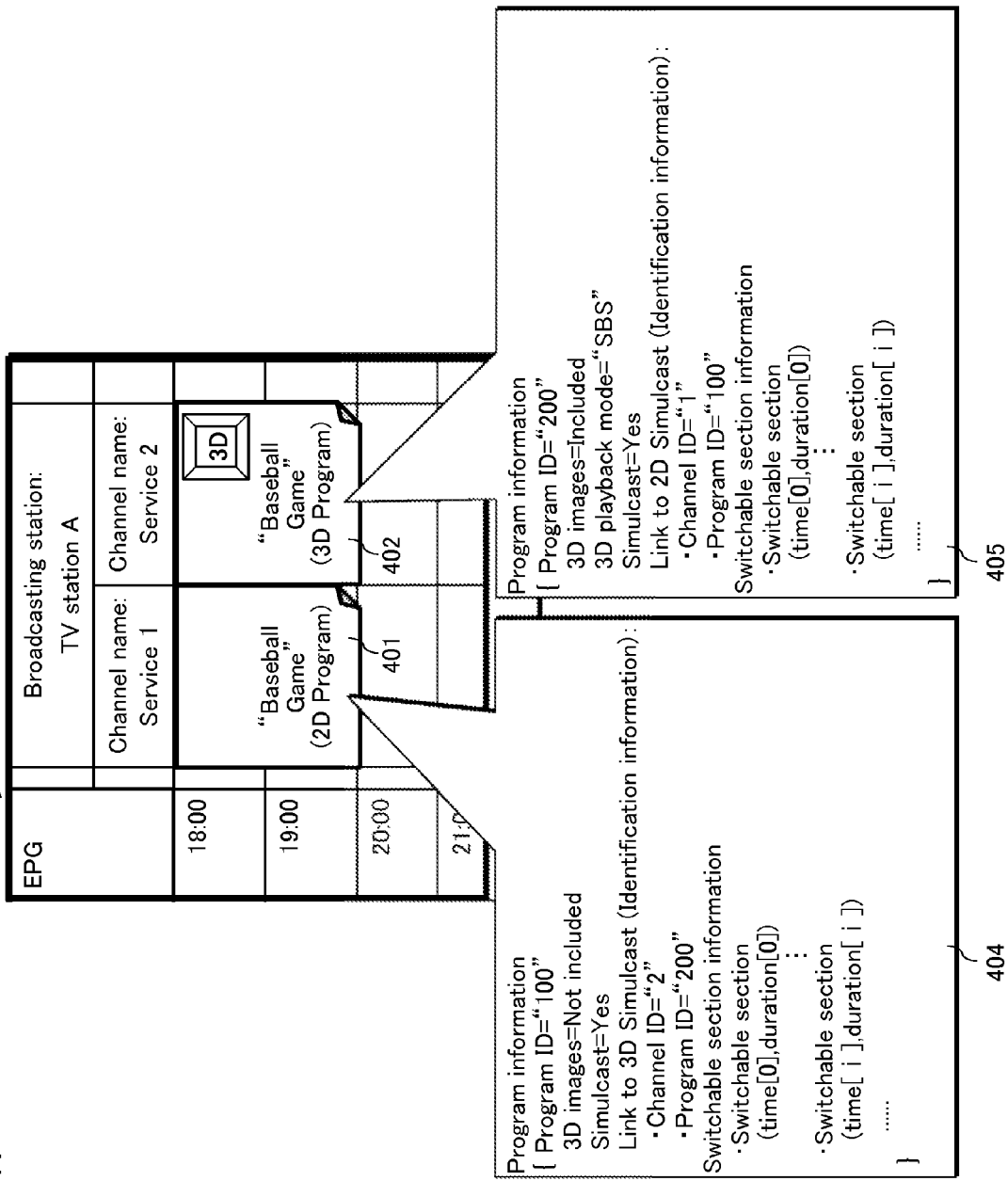
FIG. 11 shows an example of an EPG 400 displayed by the reception and playback device 200.

The following explains a relationship between each program included in the EPG 400 displayed by the reception and playback device 200 and program information piece corresponding to the program, with use of a specific example shown in FIG. 11.

In the example shown in FIG. 11, with respect to a baseball game program which is broadcast on the TV station A from 19:00 to 21:00, simulcast of 2D and 3D programs is scheduled. Accordingly, a 2D "Baseball Game" program 401 and a 3D "Baseball Game" program 402 appear in the EPG 400.

In this case, program information 404 corresponding to the 2D "Baseball Game" program 401 includes information indicating whether there is a 3D simulcast program (information indicating "Included" here), identification information for linking to the 3D program, and switchable section information, in addition to a program ID of the program 401 (a value of "100" here) and information indicating whether 3D images are included (information indicating "Not included" here).

Also, program information 405 corresponding to the 3D "Baseball Game" program 402 includes information indicating whether there is a 2D simulcast program (information indicating "Included" here), identification information for linking to the 2D program, and switchable section information, in addition to a program ID of the program 402 (a value of "200" here) and information indicating whether 3D images are included (information indicating "Included" here).

(2) Switchable Section (2-1) First Specific Example

Figure 12:
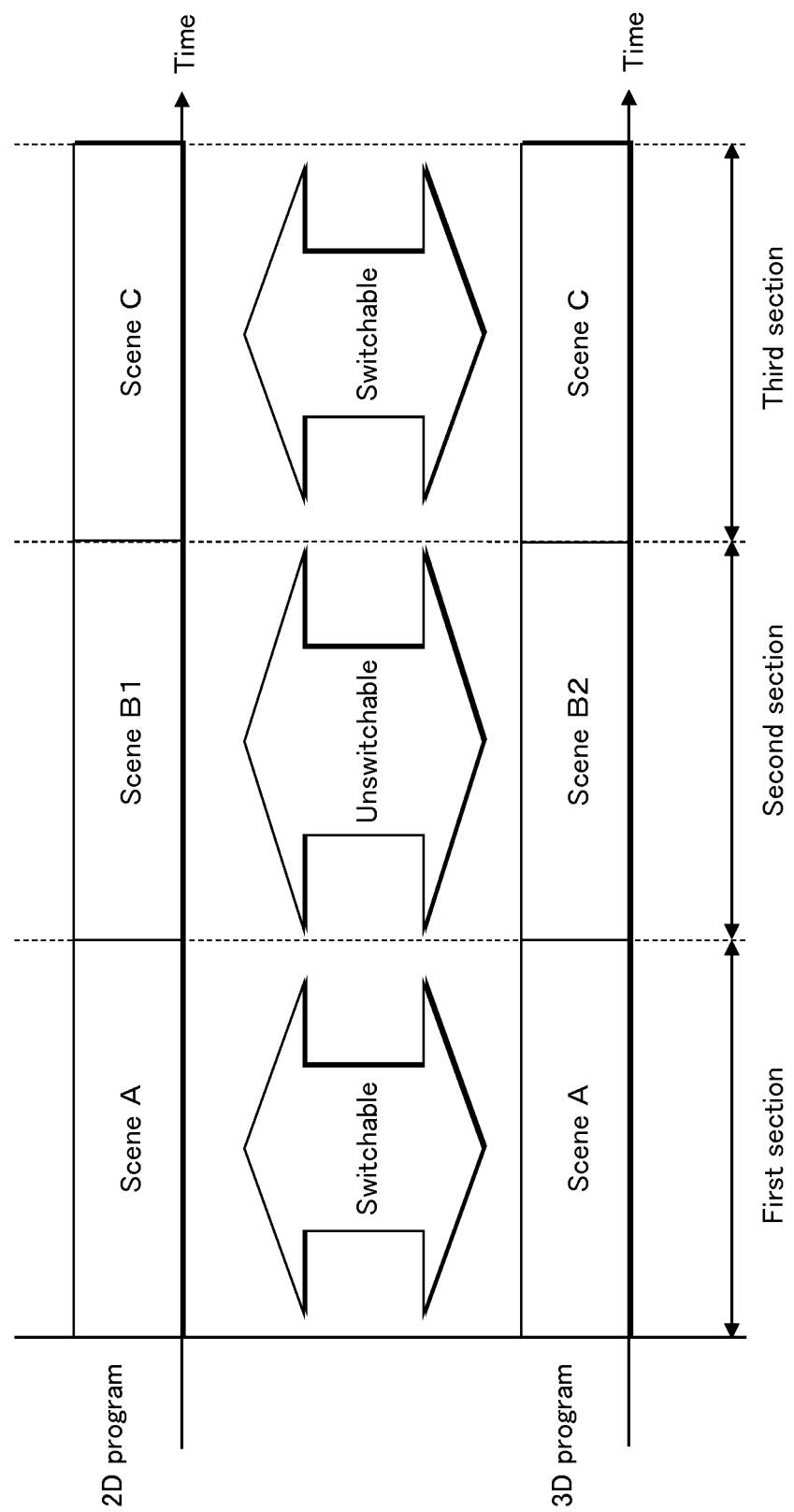
FIG. 12 explains switching between a 2D program and a 3D program which are associated with each other as a pair of simulcast programs.

There is a case where 2D images of a 2D program and 3D images of a 3D program which are simulcast partially differ from each other due to difference therebetween in terms of viewpoints. FIG. 12 shows scene composition in the time direction with respect to a 2D program and a 3D program which are associated with each other as a pair of simulcast programs.

The 2D program and the 3D program have the same entire broadcast duration. However, while the 2D program is composed of Scene A, Scene B1, and Scene C, the 3D program is composed of Scene A, Scene B2, and Scene C.

In the first section, the same scene, namely, Scene A is broadcast in both the 2D program and the 3D program. However, in the second section, while Scene B1 is broadcast in the 2D program, Scene B2 is broadcast in the 3D program. That is, broadcast contents in the second section differ between the 2D program and the 3D program. Also, in the third section, the same scene, namely, Scene C is broadcast in both the 2D program and the 3D program. In each of the first section and the third section shown in FIG. 12, the same scene is broadcast at the same time in the 2D program and the 3D program which are simulcast. Accordingly, channel switching via a user's 2D/3D switching operation is permissible in the first section and the third section. In the second section on the other hand, different scenes are broadcast at the same time in the 2D program and the 3D program. Accordingly, channel switching via a user's 2D3D switching operation is impermissible in the second section. This is because channel switching in the second section might cause the user to feel discomfort due to the difference in broadcast contents.

Figure 13:
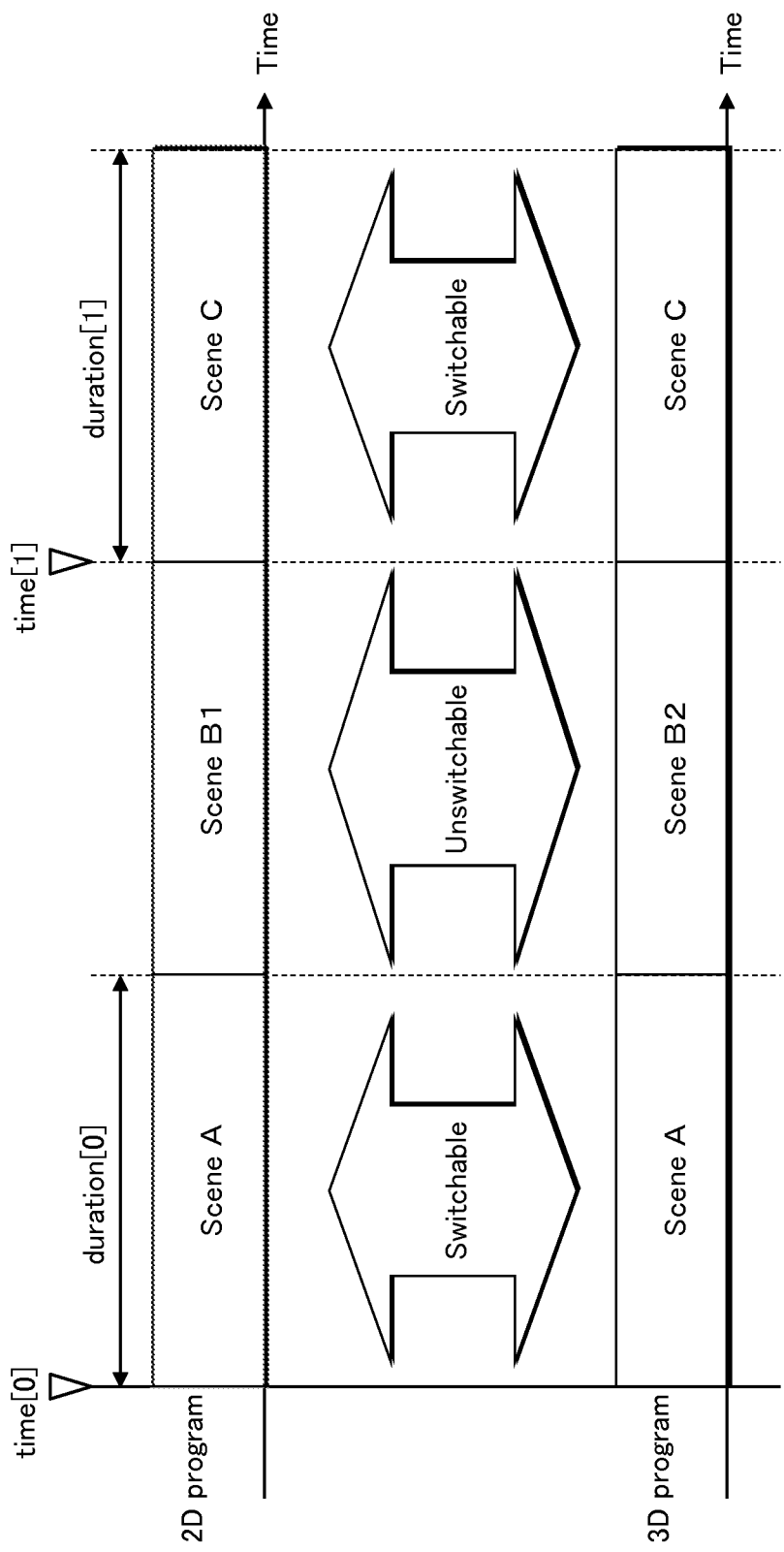
FIG. 13 explains judgment as to whether switching is permissible with use of a pair of time and duration.

FIG. 13 shows a start time and a duration of each of Scene A and Scene C which is the same between a 2D program and a 3D program. For example, Scene A has a start time indicated by time[0] and a duration indicated by duration[0], and Scene C has a start time indicated by time[1] and a duration indicated by duration[1].

The switching information descriptors 335 and 346, which are respectively included in the EITs 302 and 303, describe a pair of time[0] and duration[0] and a pair of time[1] and duration[1], respectively, as switchable section information.

Upon receiving a switching instruction from a user, the reception and playback device 200 refers to these pieces of switchable section information, and checks a reception time of the switching instruction against a section indicated by the switchable section information to judge whether simulcast switching is permissible.

(2-2) Second Specific Example

In the above first specific example, two simulcast programs have the same broadcast duration. In the second specific example, explanation is given with reference to FIG. 14 on the case where two simulcast programs (a 2D program and a 3D program) each have a different broadcast duration.

Figure 14:
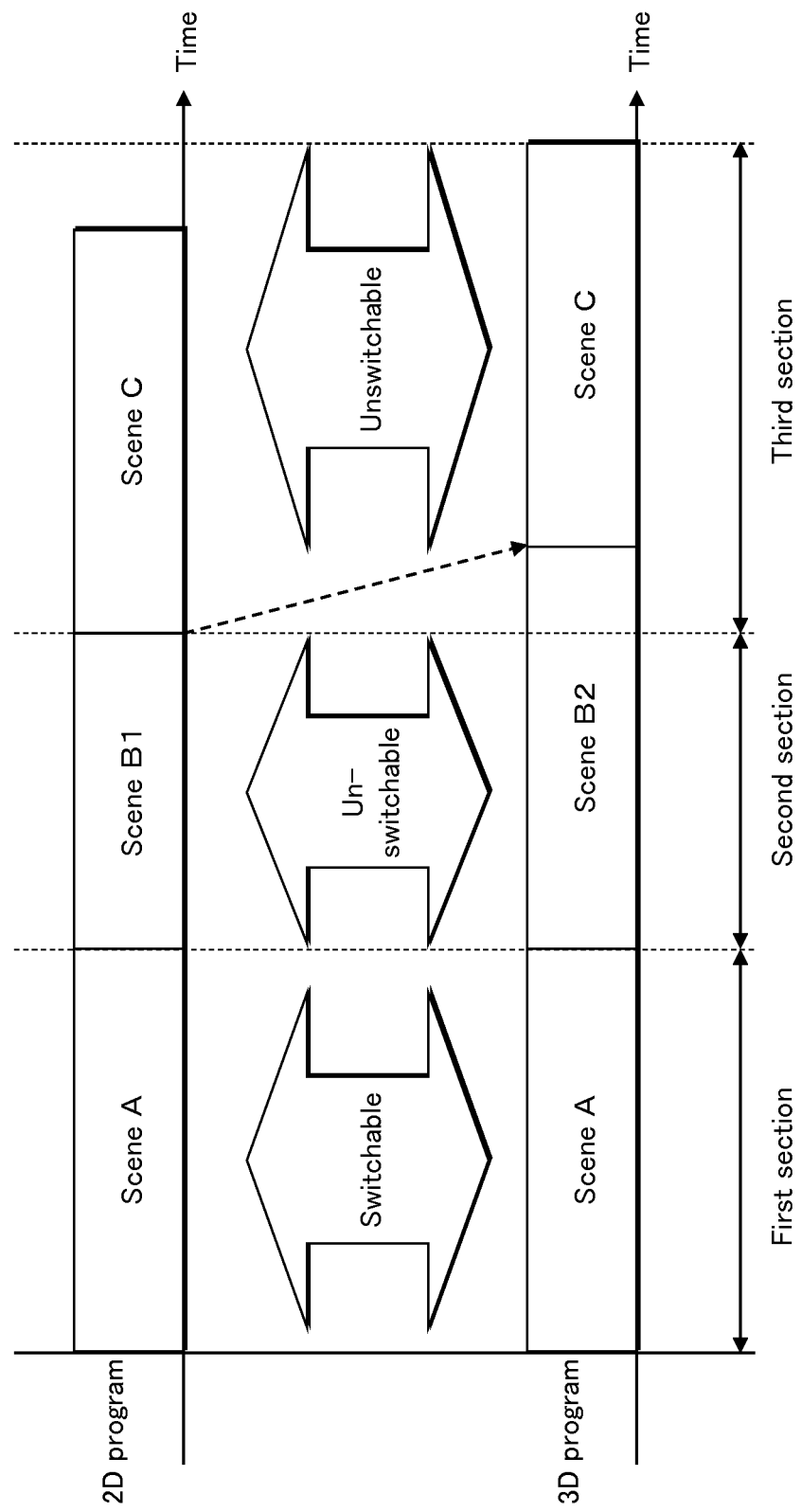
FIG. 14 explains judgment as to whether switching is permissible with use of a pair of time and duration in the case where two simulcast programs (a 2D program and a 3D program) each have a different broadcast duration.

As shown in FIG. 14, while the 2D program is composed of Scene A, Scene B1, and Scene C, the 3D program is composed of Scene A, Scene B2, and Scene C.

In the above first specific example, Scene B1 and Scene B2 have the same time length. In the second specific example, Scene B1 and Scene B2 each have a different time length.

In the first section, the same scene, namely, Scene A is broadcast at the same time in both the 2D program and the 3D program. Accordingly, channel switching via a user's 2D/3D switching operation is permissible in the first section.

In the second section on the other hand, different scenes are broadcast at the same time in the 2D program and the 3D program. Accordingly, channel switching via a user's 2D/3D switching operation is impermissible in the second section.

Furthermore, a scene following Scene B1 in the 2D program and a scene following Scene B2 in the 3D program are the same scene, namely, Scene C. Here, comparison is made between the 2D program and the 3D program in terms of contents broadcast at the same time in the third section. While Scene C is broadcast from the beginning in the 2D program, the latter part of Scene B2 and Scene C are continuously broadcast in the 3D program. In other words, although the 2D program and the 3D program include the same scene in the third section, different contents are broadcast at the same time. For this reason, channel switching via the user's 2D/3D switching operation is impermissible in the third section after all.

Accordingly, the switching information descriptors 335 and 346, which are respectively included in the EITs 302 and 303, describe only a pair of a start time (time[0]) and a duration (duration[0]) of Scene A, as switchable section information.

2.6 Modification 1

In the above embodiment, the switchable section information includes a pair of a start time (time) and a duration (duration) indicating a switchable section. However, the switchable section information is not limited to this structure.

Alternatively, a switchable section where simulcast switching is permissible may be defined with use of a flag indicating whether simulcast switching is valid.

Figure 15:
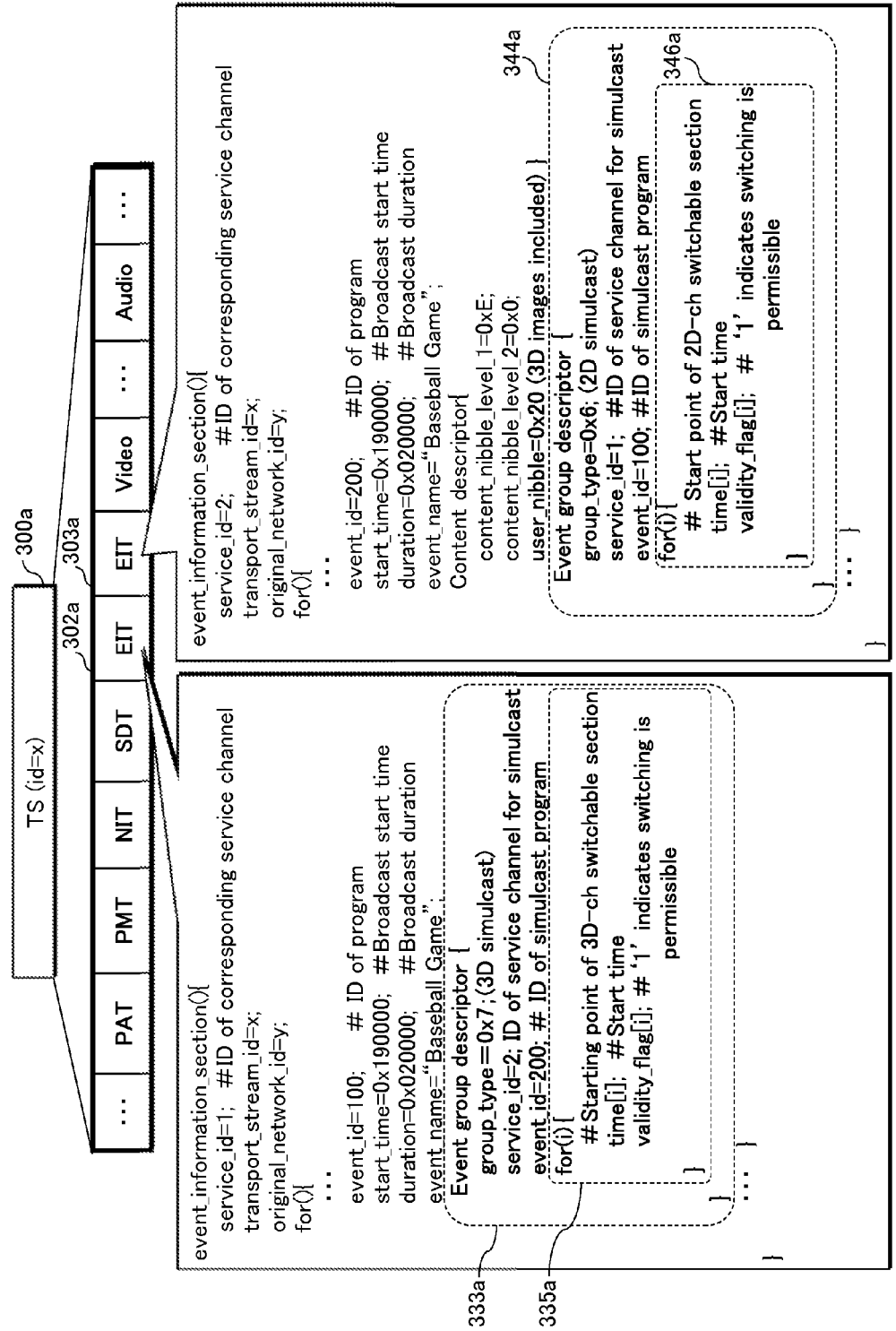
FIG. 15 shows an example of descriptions of the EITs 302a and 303a with use of a pair of time and validity_flag.

As shown in FIG. 15, suppose that an event group descriptor 333*a* included in an EIT 302*a* corresponding to a 2D program and an event group descriptor 344*a* included in an EIT 303*a* corresponding to a 3D program describe group_type indicating 2D/3D simulcast (a value "0×7" and a value "0×6", respectively). In this case, switching information descriptors 335*a* and 346*a* which are respectively included in the EITs 302*a* and 303*a* describe, as switchable section information, a pair of a time (time[i]) indicating a starting point based on which judgment is made as to whether simulcast switching is permissible and a flag (validity_flag[i]) indicating whether simulcast switching is valid. Here, i is an integer which is equal to or greater than 0 and equal to or less than n−1. Also, n is an integer which is equal to or greater than 2, and indicates the number of sections into which a program is divided.

The information "time" indicates a top time of each of a plurality of sections into which a program that is a switching destination is divided.

The information "validity_flag" indicates whether switching to the program that is the switching destination is permissible in a section having a top time indicated by time in a pair with the validity_flag. The validity_flag having a value of 1 indicates that simulcast switching is permissible, and the validity_flag having a value of 0 indicates that simulcast switching is impermissible. This allows the reception and playback device 200 to judge whether simulcast switching is permissible.

Figure 16:
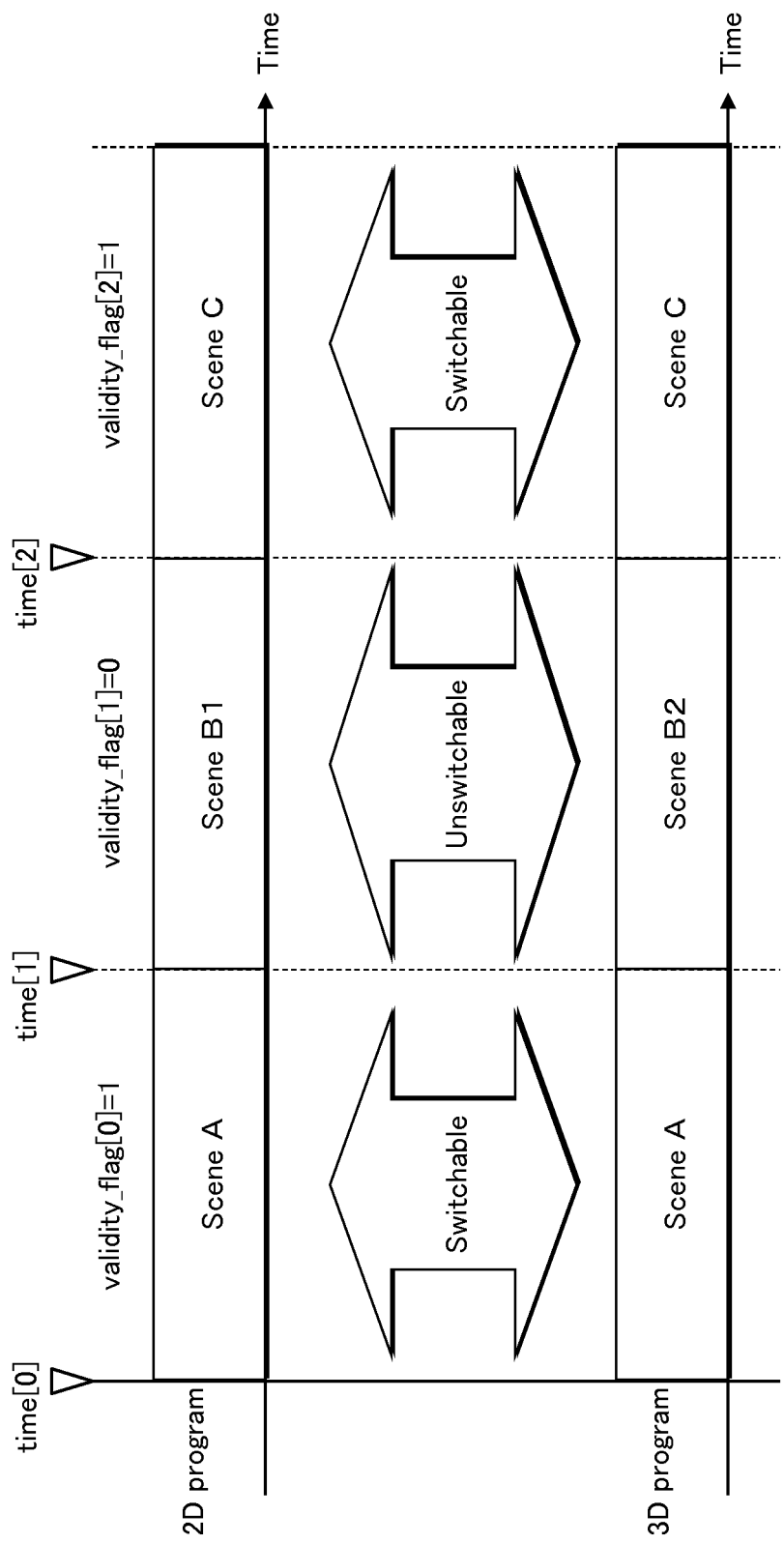
FIG. 16 explains judgment as to whether switching is permissible with use of a pair of time and validity_flag.

FIG. 16 shows judgment as to whether simulcast switching in the time direction is permissible based on the scene composition of the 2D program and the 3D program shown in FIG. 12.

As shown in FIG. 16, time[0] indicates the start time of the first section (Scene A) shown in FIG. 12, and validity_flag[0] indicates whether simulcast switching is permissible on the basis of the time indicated by time[0] as the starting point. Simulcast switching is permissible after the time indicated by time[0] until Scene A ends, and accordingly validity_flag[0] has a value of "1". The value of validity_flag[0] is valid until the current time reaches the time indicated by time[1] which is a next starting point.

Then, when the current time reaches the time indicated by time[1], the value of validity_flag[1] becomes valid on the basis of the time indicated by time[1] as the starting point. Different scenes are broadcast in the 2D program and the 3D program after the time indicated by time[1], and accordingly simulcast switching is impermissible. Accordingly, validity_flag[1] has a value of "0". Then, the value of validity_flag[1] is valid until the current time reaches the time indicated by time[2].

When the current time reaches the time indicated by time[2], the value of validity_flag[2] becomes valid. The same scene, namely, Scene C is broadcast in both the 2D program and the 3D program after the time indicated by time[2] until the program ends. Accordingly, simulcast switching is permissible, and validity_flag[2] has a value of "1". The value of validity_flag[2] is valid until the end time of the program.

With this structure, the reception and playback device 200 refers to the value of validity_flag that is valid at the time when a user has made a switching operation, thereby to judge whether simulcast switching is permissible.

Figure 17:
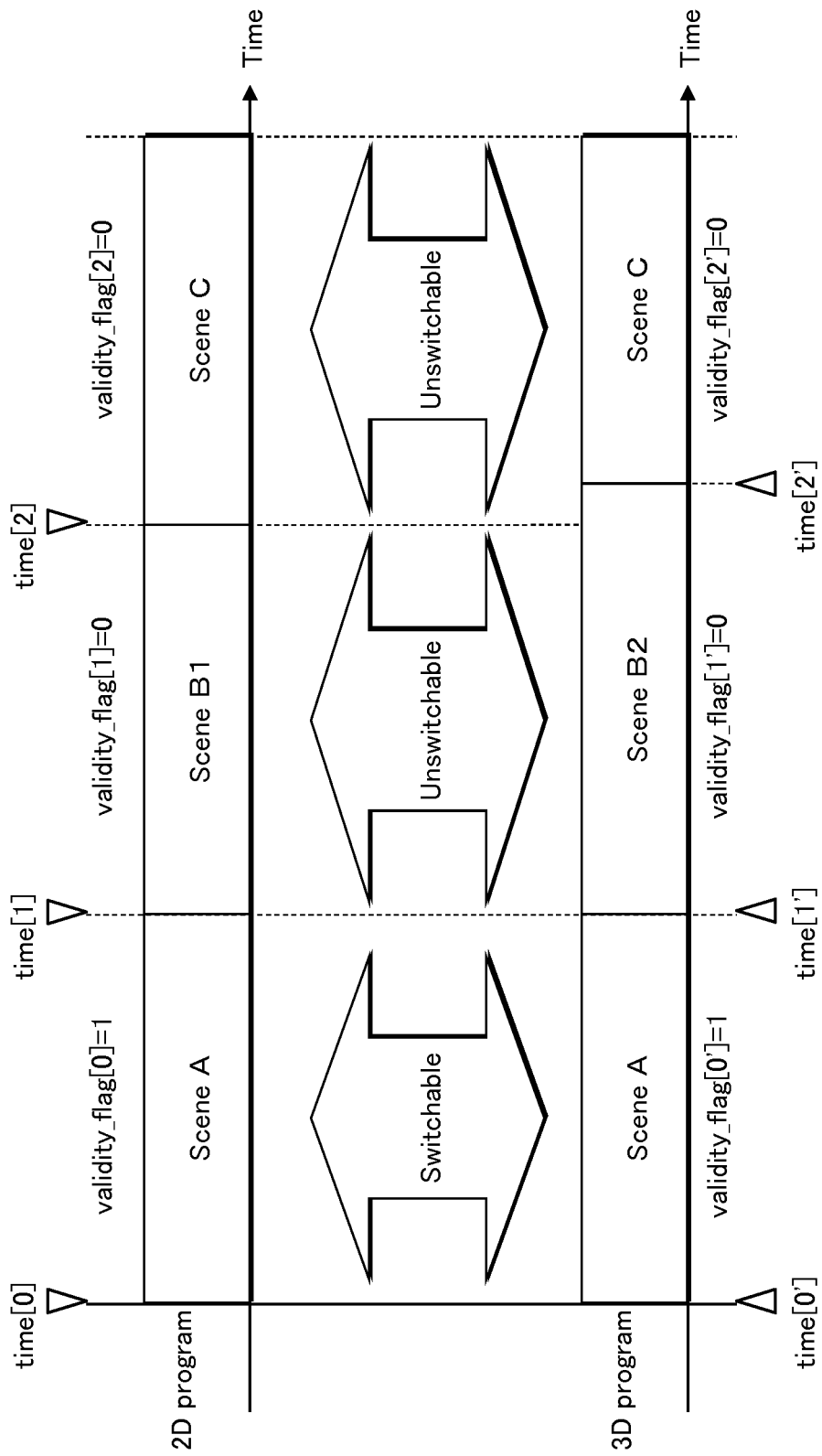
FIG. 17 explains judgment as to whether switching is permissible with use of a pair of time and validity_flag in the case where two simulcast programs (a 2D program and a 3D program) each have a different broadcast duration.

Also, FIG. 17 shows judgment as to whether simulcast switching in the time direction is permissible based on the scene composition of the 2D program and the 3D program shown in FIG. 14.

As shown in FIG. 17, time[0], time[1], and time[2] indicate respective start times of Scene A, Scene B1, and Scene C of the 2D program shown in FIG. 12, and validity_flag[0], validity_flag[1], and validity_flag[2] indicate whether simulcast switching is permissible in Scene A, Scene B1, and Scene C of the 2D program, respectively. Furthermore, time[0'], time[1'], and time[2'] indicate respective start times of Scene A, Scene B2, and Scene C of the 3D program shown in FIG. 12, and validity_flag[0'], validity_flag[1'], and validity_flag[2'] indicate whether simulcast switching is permissible in Scene A, Scene B2, and Scene C of the 3D program, respectively.

Figure 18:
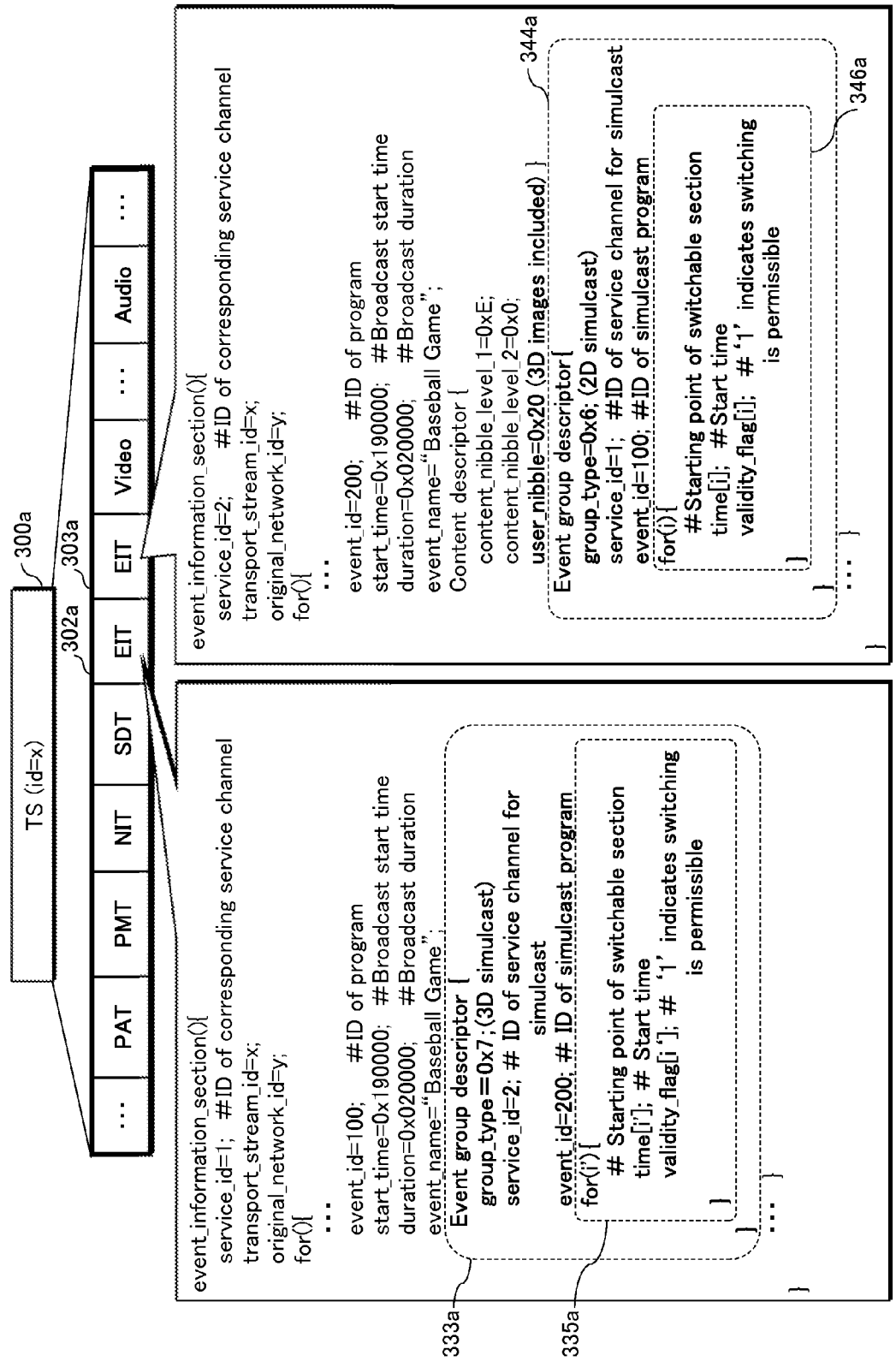
FIG. 18 shows an example of descriptions of the EITs 302a and 303a with use of a pair of time and validity_flag in the case where two simulcast programs (a 2D program and a 3D program) each have a different broadcast duration.

FIG. 18 shows a specific example of an EIT that describes a relationship between time and validity_flag in each of the 2D program and the 3D program shown in FIG. 17.

As shown in FIG. 18, the EIT 302*a* corresponds to the 2D program. The switching information descriptor 335*a* included in the EIT 302*a* describes time[i'] and validity_flag [i'] of the 3D program, namely, time[0'], time[1'], and time[2'] and validity_flag[0'], validity_flag[1'], validity_flag [2'] in one-to-one correspondence.

Also, the EIT 303*a* corresponds to the 3D program. The switching information descriptor 346*a* included in the EIT 303*a* describes time[i] and validity_flag[i] of the 2D program, namely, time[0], time[1], and time[2] and validity_flag[0], validity_flag[1], and validity_flag[2] in one-to-one correspondence.

2.7 Modification 2

In the above explanation, one TS 300 includes two service channels. However, the present invention is not limited to this structure.

It is not necessary that simulcast programs are carried in one TS, and may alternatively be carried in separate TSs.

Figure 19:
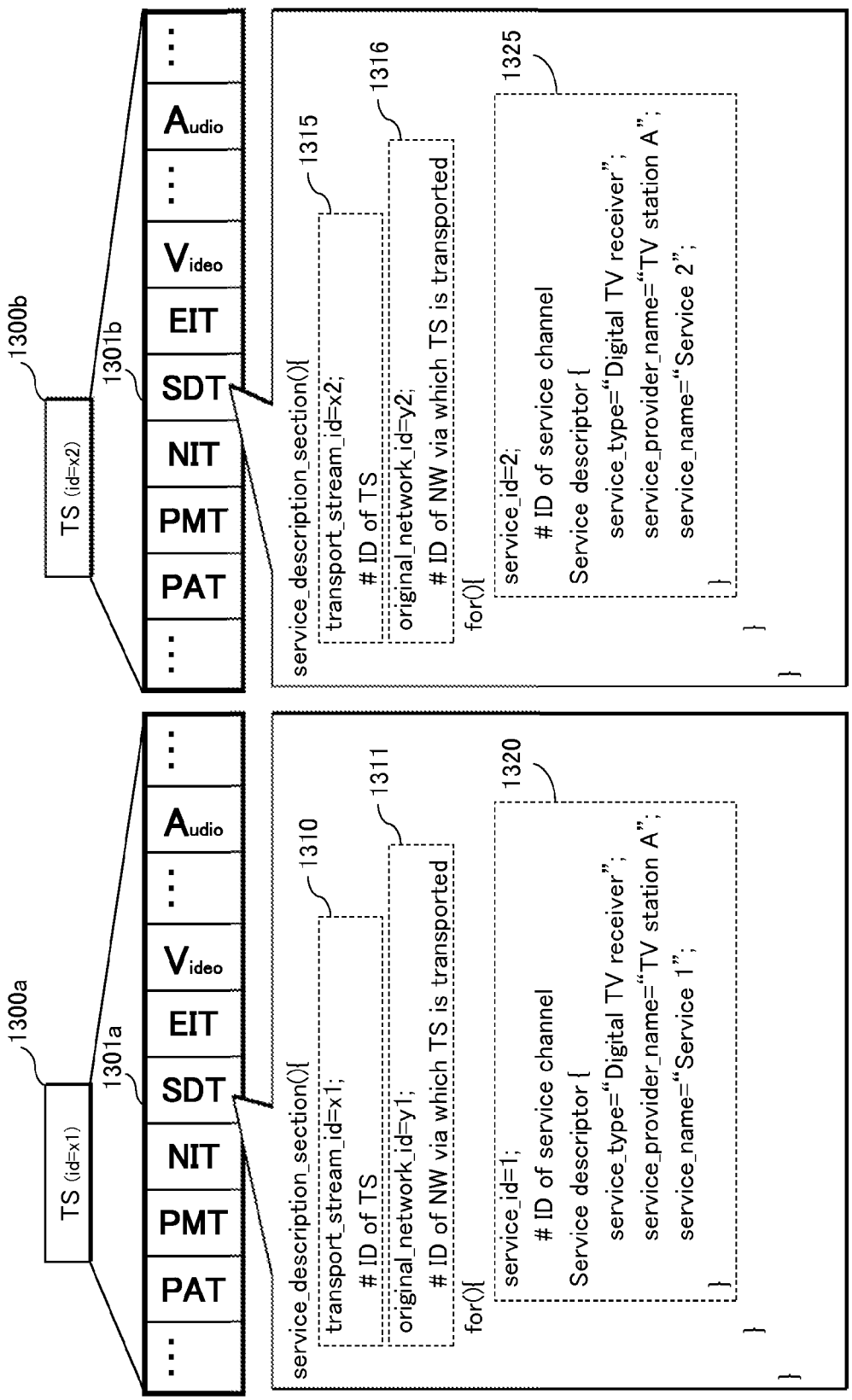
FIG. 19 shows an example of descriptions of SDTs 1301a and 1301b in the case where two simulcast programs are carried on separate TSs (TSs 1300a and 1300b).
Figure 20:
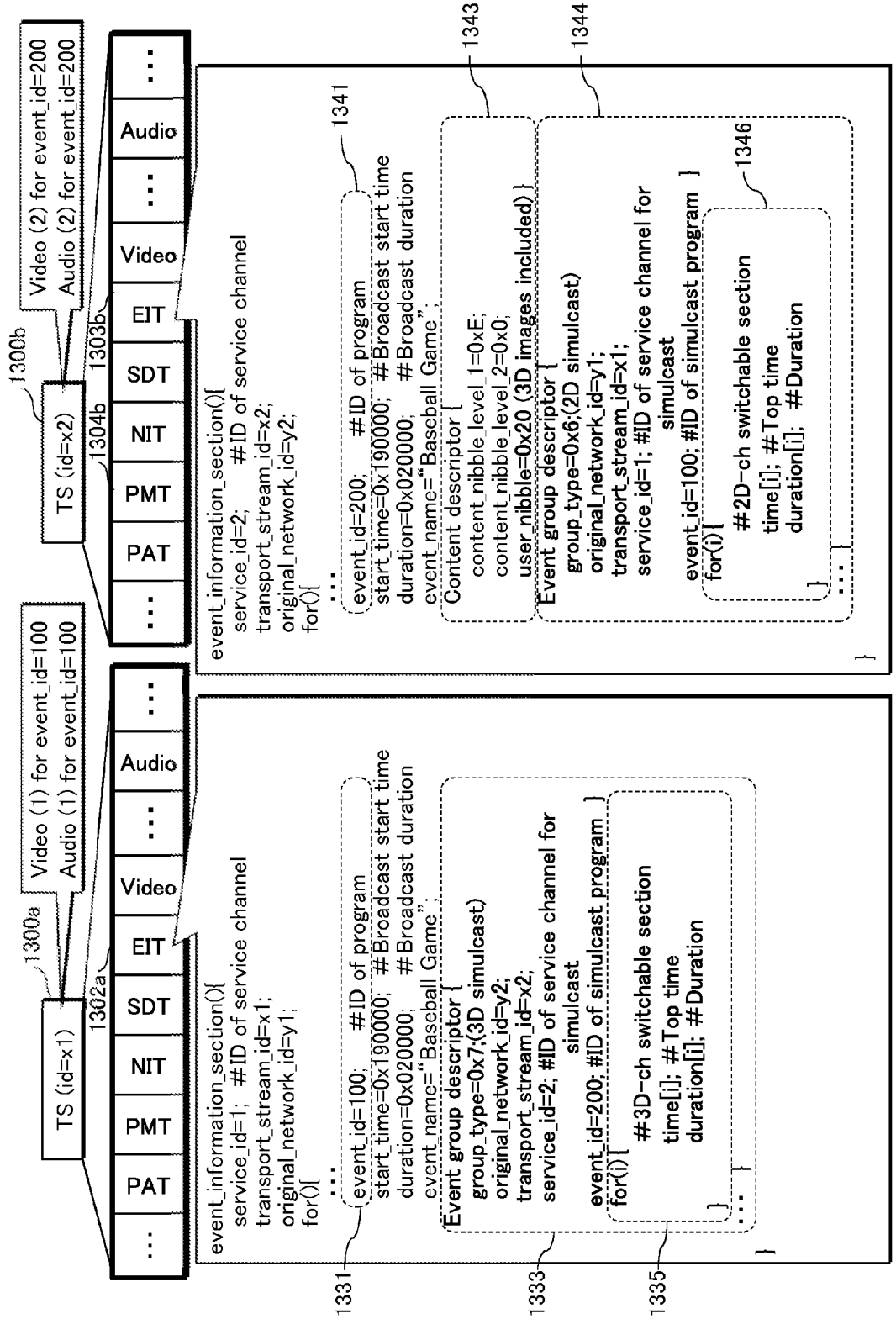
FIG. 20 shows an example of descriptions of EITs 1302a and 1303b in the case where two simulcast programs are carried on separate TSs (the TSs 1300a and 1300b).

FIG. 19 and FIG. 20 each show an example where two simulcast programs (a 2D program and a 3D program) are carried in separate TSs 1300*a* and 1300*b*.

The TS 1300*a* includes an SDT 1301*a* and an EIT 1302*a* as shown in FIG. 19 and FIG. 20.

The TS 1300*a* is a transport stream of a program on a service channel of Service "1" (service_id=1), and is distributed from a TV station having a name "TV Station A" (service_provider_name="TV Station A"), and a channel name having "Service 1" (service_name="Service 1"), as identified by a descriptor 1320 defining information relating to a service channel in the SDT 1301a.

Also, the TS 1300b is a transport stream of a program on a service channel of Service "2" (service_id=2), and is distributed from a TV station having a name "TV Station A" (service_provider_name="TV Station A"), and a channel name having "Service 2" (service_name="Service 2"), as identified by a descriptor 1325 defining information relating to a service channel in the SDT 1301b.

The TS 1300a and the TS 1300b each have different stream ID (transport_stream_id) and network ID (original_network_id) because the respective TSs differ in generation and origination source via which the TS is transported. Specifically, as shown in FIG. 19, a stream ID 1310 and a network ID 1311 of the TS 1300a are identified by transport_stream_id=x1 and original_network_id=y1, respectively, and a stream ID 1315 and a network ID 1316 of the TS 1300b are identified by transport_stream_id=x2 and original_network_id=y2, respectively. That is, the location of each TS is uniquely identified with the two data fields of transport_stream_id and original_network_id.

FIG. 20 shows a description example of the EIT 1302a and the EIT 1302b that are included in the TS 1300a and the TS 1300b, respectively.

In an event ID 1331 of the EIT 1302a, event_id=100 is defined, and this indicates that the TS 1300a, which includes the EIT 1302a, includes video and audio streams of a program identified by event_id=100.

Also, in an event ID 1341 of the EIT 1302b, event_id=200 is defined, and this indicates that the TS 1300b, which includes the EIT 1302b, includes video and audio streams of a program identified by event_id=200. Furthermore, a content descriptor 1343 of the EIT 1302b indicates that the program identified by event_id=200 is a 3D program.

The TS 1300a and the TS 1300b are transport streams for simulcast, and accordingly associate with each other by the event group descriptors 1333 and 1344. The present modification differs from the above embodiment in that transport_stream_id and original_network_id relating to a service channel of the other program that is simulcast are described in the event group descriptor. For example, the event group descriptor 1333 of the EIT 1302a describes a stream ID (transport_stream_id=x2) and a network ID (original_network_id=y2) of the TS 1300b identified by event_id=200. Other descriptions of the event group descriptor 1333 are the same as those as in the event group descriptor 333. On the other hand, the event group descriptor 1344 of the EIT 1302b describes a stream ID (transport_stream_id=x1) and a network ID (original_network_id=y1) of the TS 1300a identified by event_id=100. Other descriptions of the event group descriptor 1344 are the same as those as in the event group descriptor 333.

The stream ID and the network ID are added to the event group descriptor for the following reason.

In the present modification, service channels are included in separate TSs, the event descriptor to be added needs to include transport_stream_id and original_network_id to identify each TS as reference information, in addition to the ID of the service channel (service_id) and the program ID (event_id). This is the reason for the above. As a result of addition of these pieces of information, each program in a simulcast pair is enabled to identify the other program in the pair.

Also, it is possible to judge whether switching is permissible with use of the switch information descriptors 1335 and 1346.

The PMT 1304b included in the TS 1300b describes the playback mode of 3D images included in the TS 1300b, in the same manner as in the PMT 304 shown in the above embodiment.

As explained above, with addition of information associating simulcast programs to the EIT, which is program information, it is possible to identify the simulcast programs and judge whether switching between the simulcast programs is permissible even in the case where the simulcast programs are carried on two separate TSs.

Reference information identifying the other program of a simulcast pair differs depending on whether the simulcast programs are included in one TS or in two separate TSs. Therefore, group_type defined by each event group descriptor may be set to a different value.

Also, the switching information descriptors 1335 and 1346 shown in FIG. 20 are each composed of a pair of time and duration as switching information. Alternatively, the switching information descriptors 1335 and 1346 may each describe a pair of time and validity_flag as switching information.

2.8 Other Modifications

Also, the present invention for example includes the following modifications without limiting to the above embodiment and so on.

(1) In the above embodiment, an example of the reception and playback device is a digital TV receiver. However, the present invention is not limited to this. Alternatively, the reception and playback device may be any device that receives and plays back a transport stream, such as a DVD recorder, a BD (Blu ray Disc) recorder, and an STB (Set Top Box).

(2) In the above embodiment, the 3D playback mode is described in a PMT. However, the present invention is not limited to this.

Alternatively, the 3D playback mode may be described by a component descriptor in an EIT.

Figure 10:
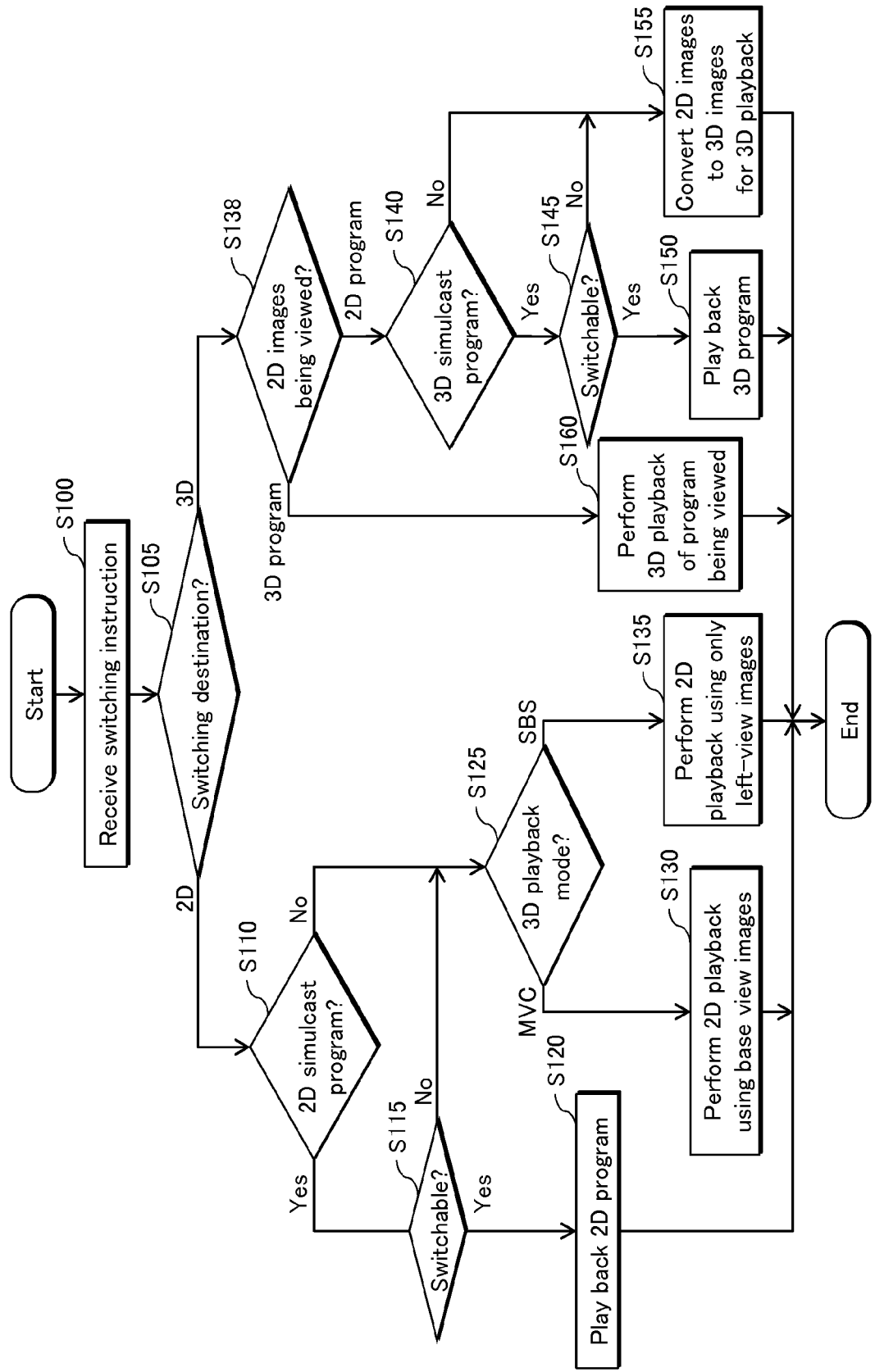
FIG. 10 is a flow chart showing operations of the reception and playback device 200.

(3) In the above embodiment, the operations of the reception and playback device 200 shown in FIG. 10 are just an example, and the present invention is not limited to this.

In Step S110 shown in FIG. 10 for example, when judging that there is a 2D simulcast program (Step S110: Yes), the reception and playback device 200 may judge whether the 3D playback mode of the 3D program, which is currently viewed, is the MVC mode or the SBS mode before executing Step S115. In this case, when judging that the 3D playback mode is the MVC mode, the reception and playback device 200 executes Step S130. When judging that the 3D playback mode is the SBS mode, the reception and playback device 200 executes Step S115.

Figure 21:
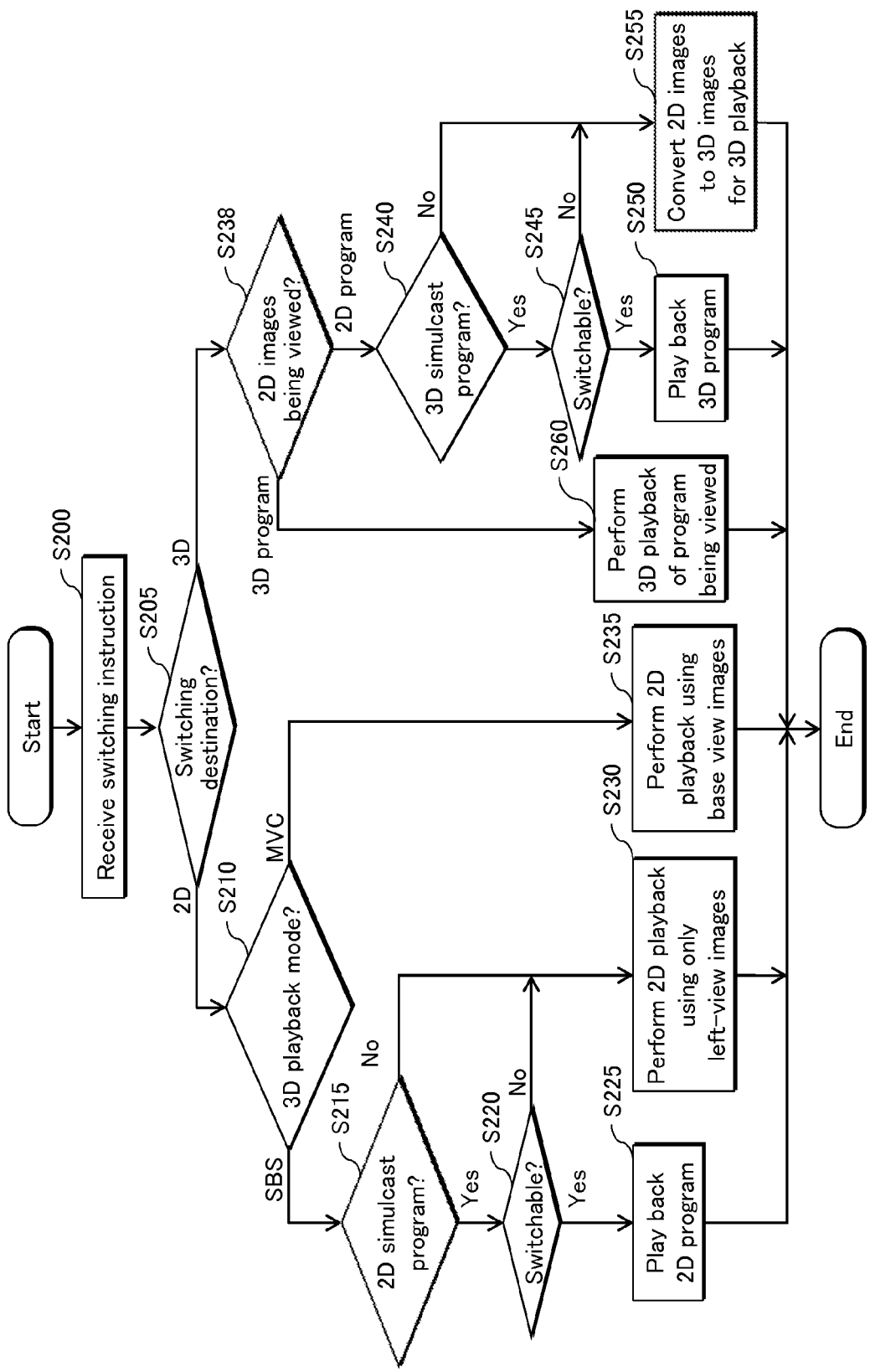
FIG. 21 shows modified operations of the reception and playback device 200.

Alternatively, the reception and playback device 200 may judge whether the 3D playback mode is the MVC mode or the SBS mode before judging whether there is a 2D simulcast program. FIG. 21 shows a flow in this case.

Steps S200 and S205 are the same as Steps S100 and W105 shown in FIG. 10, respectively, and accordingly explanation thereof is omitted here.

When judging that the switching destination is a 2D program (Step S205: 2D), the 2D/3D switching unit 213 judges as to the 3D playback mode of the 3D program, that is, judges whether the 3D playback mode is the SBS mode or the MVC mode (Step S210).

When the 2D/3D switching unit 213 judges that the 3D playback mode is the MVC mode (Step S210: MVC), the playback processing unit 209 plays back base view images included in the 3D video stream as 2D images (Step S235). Specific operations for playback are the same as the operations in Step S130 shown in FIG. 10, and accordingly explanation thereof is omitted here.

When judging that the 3D playback mode is the SBS mode (Step S210: SBS), the 2D/3D switching unit 213 judges whether there is a 2D simulcast program (Step S215).

When judging that there is a 2D simulcast program (Step S215: Yes), the 2D/3D switching unit 213 judges whether switching from the 3D program to the 2D program at the current time is permissible (Step S220).

When the 2D/3D switching unit 213 judges that switching is permissible (Step S220: Yes), the playback processing unit 209 switches the playback target stream from the 3D video stream to the 2D video stream, and plays back the 2D program (Step S225). Specific operations for playback are the same as the operations in Step S120 shown in FIG. 10, and accordingly explanation thereof is omitted here.

When the 2D/3D switching unit 213 judges that there is no 2D simulcast program (Step S215: No), or when the 2D/3D switching unit 213 judges that switching is impermissible (Step S220: No), the playback processing unit 209 crops left-view image parts of side-by-side frames included in the 3D video stream, and plays back the cropped left-view image parts as 2D images (Step S230). Specific operations for playback are the same as the operations in Step S135 shown in FIG. 10, and accordingly explanation thereof is omitted here.

Steps S238 to S260 are the same as Steps S138 to S160 shown in FIG. 10, respectively, and accordingly explanation thereof is omitted here.

(4) In the above embodiment, the event group descriptors are used for associating a pair of two or more simulcast programs and describing information indicating whether switching between the simulcast programs is permissible. However, the present invention is not limited to this.

Alternatively, descriptors having a new data structure may be used to associate a pair of simulcast programs.

(5) In the above embodiment, with respect to a simulcast pair of a 2D program and a 3D program which is distributed as a broadcast wave, the 2D program and the 3D program are associated with each other, and also information indicating whether switching between the 2D program and the 3D program is permissible is described. However, the present invention is not limited to this.

Alternatively, with respect to a simulcast pair of a 2D program and a 3D program which is distributed via PCs (Personal Computers), IP (Internet Protocol) broadcast, and VOD (Video ON Demand) in addition to a simulcast pair distributed as a broadcast wave, association of the 2D program and the 3D program with each other and description of information indicating whether switching between the 2D program and the 3D program is permissible may be performed.

As an association method in this case, a URL (Uniform Resource Locator) is used which indicates a storage location of a program. Information indicating whether switching is permissible is described in the same manner as in the above embodiment.

The URL and the information indicating whether switching is permissible may be described in a stream for distributing the program together with the program or in a file included in a program guide.

Alternatively, with use of URLs and event group descriptors, association of programs and switching of the display mode (viewing mode) may be performed among different distribution formats such as broadcasting, PCs, IP broadcast, and VOD.

(6) In the above embodiment, the EITs 302 and 303, particularly, the event group descriptors 333 and 344, may be generated by a method according to which "group_type", "service_id", and "event_id" are stored as parameter variables in advance in a device for generating an EIT (the transmission device 100 or an external device), and information relating to these parameter variables are received from a user. This generation method is just an example, and other method may be used.

Note that description other than the event group descriptors 333 and 344 is the same as conventional description, and accordingly explanation thereof is omitted.

(7) In the above embodiment, simulcast of the 2D broadcast mode and the 3D broadcast mode is assumed. Alternatively, the present invention is applicable to simulcast of any combination of broadcast mode.

The present invention is for example applicable to the case where viewers who continue viewing according to a conventional broadcast mode after introduction of a new broadcast mode are provided with a broadcasting service keeping backward compatibility between the conventional broadcast mode and the new broadcast mode and having a maintained image quality.

There is an expectation for provision of a video service of 4K2K resolution and 8K4K resolution, which are higher than the resolution of full HD (1920×1080) in the conventional broadcasting system in terms of resolution, image quality, and definition.

In this case, there is a possibility that simulcast of the full HD mode and the 4K2K mode or simulcast of the full HD mode and the 8K4K mode is operated in the same manner as simulcast of the 2D mode and the 3D mode. The operational advantage of the present invention is the same even in the case where a 3D program is replaced with a program of the 4K2K mode, and simulcast is effective as the means for securing the backward compatibility.

In the case where a program is recorded for example, there is no problem as long as direct recording (DR) is used for recording 4K images. However, if 4K images cannot be recorded depending on the remaining amount of a recording area or the format of a recording destination medium, full HD images may be recorded without down-converting the 4K images. In this case, when a recording unit included in the reception and playback device judges that DR is impossible, the recording unit outputs, to the program information management unit, an instruction to switch the display mode of recording target images from the 4K display mode to the full HD display mode. When judging that a full HD program is simulcast, the program information management unit switches the recording target images from the 4K images to 2K images. This allows the reception and playback device to reduce deterioration in image quality and calculation costs caused by down-conversion.

Alternatively, in the case where broadcast is received by a 4K compatible STB tuner and is viewed in a 4K incompatible digital television receiver, not the digital television receiver but the STB tuner may have a switching function. In this case, the STB tuner may check the Preference of the digital television receiver to automatically switch images to be transmitted between 4K images and Full HD images.

Although a viewer can view images with 4K resolution in a 4K compatible digital television receiver, the number of 4K broadcast programs is limited at an early stage after the start of 4K broadcast. For this reason, most of programs are considered to be broadcast as full HD programs. As a result, there is a possibility that even if a viewer can view 4K images, the viewer unintentionally continues to view 2K images of the full HD program. In such a case, a 4K compatible digital television receiver may display any message prompting the viewer to switch to 4K images. Furthermore, when the viewer hopes viewing of 4K images and a 4K2K program is simulcast with a full HD program, the 4K compatible digital television receiver may switch to the 4K2K program.

Also, in the case where a full HD program and a 4K2K program which are simulcast have scenes that partially differ from each other for example, switchable section information indicating a section in which switching is permissible between the scenes may be described in a switching information descriptor of a program which is a switching destination. The switchable section information is composed of a pair of time and duration, a pair of time and validity_flag, or the like.

(8) In the above embodiment, the SBS mode is used as an example of the playback mode of 3D images of the resolution of half HD. Alternatively, the top-and-bottom mode may be used according to which a left-view image and a right-view image in a pair are separately compressed to ½ in the vertical direction and disposed next to each other.

Also, in the above embodiment, the MVC mode is used as a mode compatible with 2D playback. Alternatively, the dual stream mode may be used for example according to which a dual stream is generated according to the MPEG2 format. The dual stream is composed of separate left-view stream and right-view stream.

(9) In the above embodiment, the 2D/3D switching unit 213 may hold therein information indicating whether switching between 2D and 3D programs at the current time is permissible with respect to a program which is currently viewed. In this case, the 2D/3D switching unit 213 does not need to refer to the program information DB 212 to check whether switching to a program simulcast with the program which is currently viewed is permissible each time receiving a switching instruction from a user. Instead, once the 2D/3D switching unit 213 acquires information indicating whether switching at the current time is permissible with respect to the program which is currently played back, the 2D/3D switching unit 213 only needs to hold the information in a memory. This allows the 2D/3D switching unit 213, at a next reception of a switching instruction, to refer to the held information indicating whether switching is permissible, thereby to reduce the processing period.

(10) The data structure of the switchable section information explained above is just an example. The switchable section information is not limited this, and may have any data structure as long as program information includes necessary and sufficient information for judging whether simulcast switching is permissible.

In the above embodiment, judgment is made as to whether switching between a 2D program and a 3D program is permissible with use of information indicating a switchable section in which the same scene which is switchable is broadcast in the 2D program and the 3D program. Alternatively, the judgment may be made with use of information indicating an unswitchable section in which different scenes are broadcast in the 2D program and the 3D program, for example. With use of the information indicating the section in which different scenes are broadcast, it is possible to extract a section in which a scene which is unique to each of the 2D program and the 3D program is broadcast.

(11) The explanation is given on that switching of the display mode (viewing mode) is impermissible in the third section in FIG. 14. Alternatively, switching may be permissible only in the following case. Specifically, with respect to the same scene between a 2D program and a 3D program in the third section (Scene C in FIG. 14), when switching is performed from a program having an earlier broadcast start time to a program having a later broadcast start time (from the 2D program to the 3D program in FIG. 14), if broadcasting of the same scene C has not started yet in the 3D program which is a switching destination at a reception time of a switching instruction, switching may be permissible by shifting the broadcast duration of Scene C within a user's permissible range.

If switching is performed from a program having a later broadcast start time to a program having an earlier broadcast start time (for example, from the 3D program to the 2D program in FIG. 14), a scene which has not yet been viewed by a viewer has already been broadcast in the 2D program which is a switching destination. This causes the viewer to feel inconvenient because the viewer cannot view some scenes. For this reason, switching in this case should be avoided.

Compared with this, switching is permissible from a program having an earlier broadcast start time to a program having a later broadcast start time (for example, from the 2D program to the 3D program in FIG. 14). This is because even if the viewer needs to view a scene in the 3D program after switching which is the same as a scene the viewer has already viewed in the 2D program, the viewer cannot miss any scene after switching.

Figure 22:
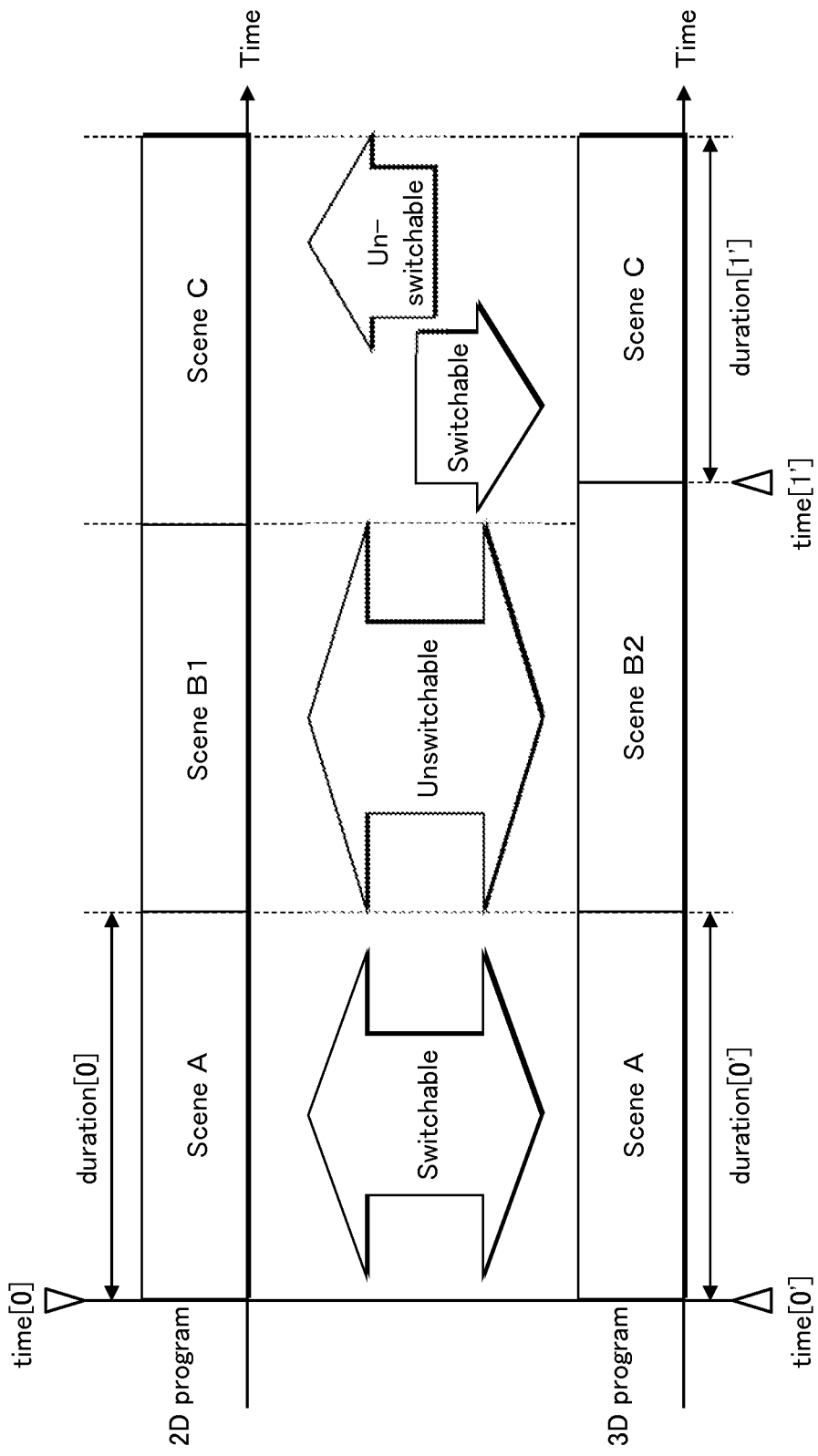
FIG. 22 explains a modified judgment as to whether switching is permissible with use of a pair of time and duration in the case where two simulcast programs (a 2D program and a 3D program) each have a different broadcast duration.
Figure 23:
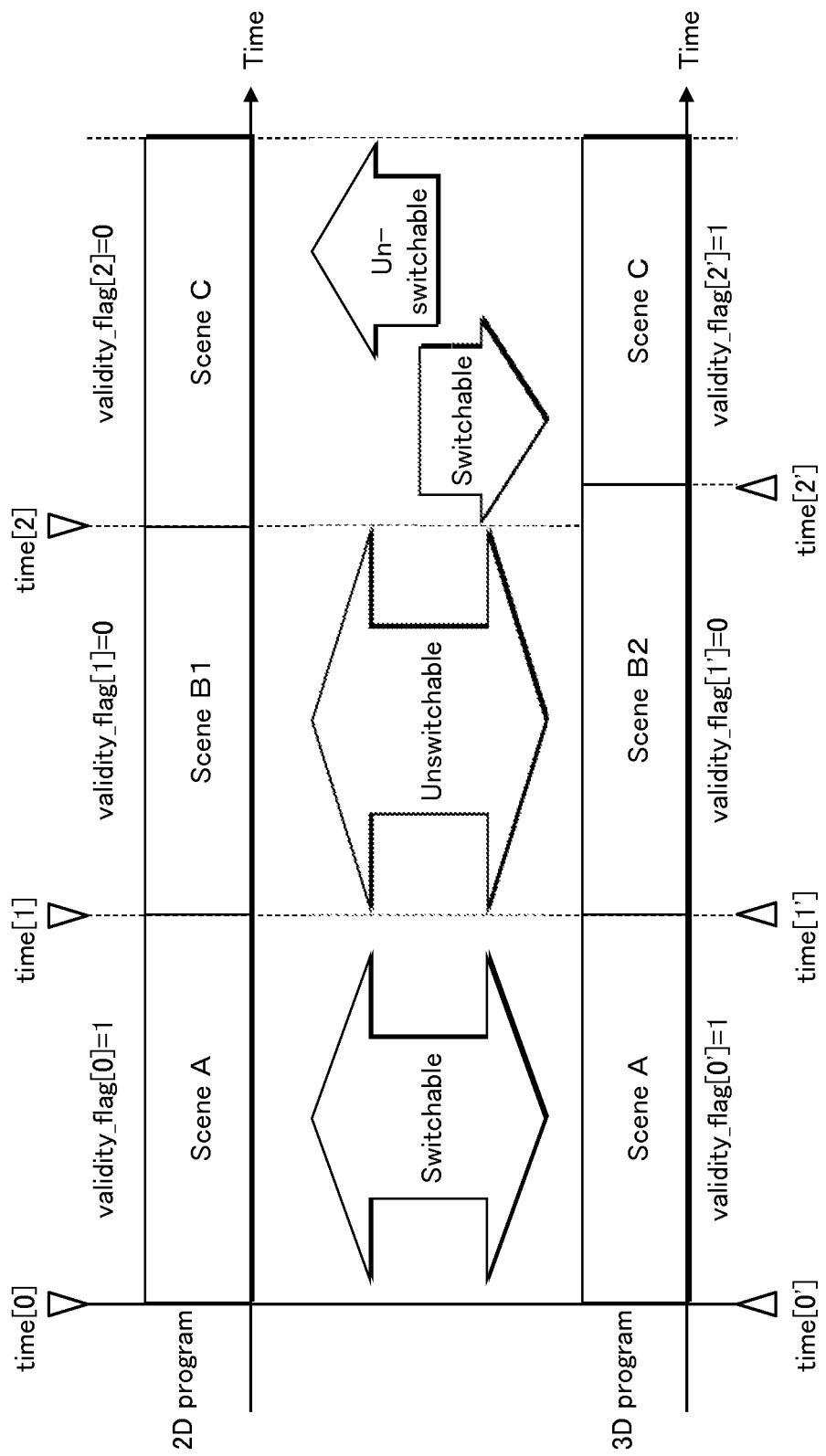
FIG. 23 explains a modified judgment as to whether switching is permissible with use of a pair of time and validity_flag in the case where two simulcast programs (a 2D program and a 3D program) each have a different broadcast duration.

FIG. 22 and FIG. 23 each show an example of designation of a switchable section in the above case.

FIG. 22 shows an example of designation of a switchable section with use of a pair of time and duration.

The same scene, namely, Scene A is broadcast at the same time both in a 2D program and a 3D program which are simulcast. Accordingly, the switching information descriptor 335 included in the EIT 302 corresponding to the 2D program, which is shown in FIG. 4, describes a pair of time[0'] and duration[0'] of the 3D program which is a switching destination. Similarly, the switching information descriptor 346 included in the EIT 303 corresponding to the 3D program, which is shown in FIG. 4, describes a pair of time[0] and duration[0] of the 2D program which is a switching destination. Also, with respect to Scene C, switching is permissible from the 2D program having an earlier broadcast start time to the 3D program having a later broadcast start time. Accordingly, the switching information descriptor 335 further describes a pair of time[1'] and duration[1'] of the 3D program which is a switching destination.

FIG. 23 shows an example of designation of a switchable section with use of a pair of time and validity_flag.

The same scene, namely, Scene A is broadcast at the same time both in a 2D program and a 3D program which are simulcast. Accordingly, the switching information descriptor 335 included in the EIT 302 corresponding to the 2D program, which is shown in FIG. 4, describes a pair of time[0'] and validity_flag[0'] (=1) of the 3D program which is a switching destination. Similarly, the switching information descriptor 346 included in the EIT 303 corresponding to the 3D program, which is shown in FIG. 4, describes a pair of time[0] and validity_flag[0] (=1) of the 2D program which is a switching destination. Also, with respect to Scene C, switching is permissible from the 2D program having an earlier broadcast start time to the 3D program having a later broadcast start time. Accordingly, the switching information descriptor 335 further describes a pair of time[1'] and validity_flag[1'] (=1) of the 3D program which is a switching destination.

(12) In the above embodiment, when switching is performed from one of simulcast programs to the other simulcast program, for example from a 2D program to a 3D program or from a 3D program to a 2D program, the reception and playback device 200 may display a message indicating switching from one of simulcast programs to the other simulcast program.

This allows a user to recognize that a channel itself is switched from a channel of one of simulcast programs the user is currently viewing to a channel of the other simulcast program.

(13) In the above embodiment, in the case where switching of the display mode (viewing mode) is impermissible, the reception and playback device 200 performs playback processing using a video stream of a program the user is currently viewing such that the program is displayed in a user's desired display mode.

Alternatively, in the case where switching of the display mode is impermissible, the reception and playback device 200 may continue to perform playback using the video stream of the program the user is viewing without switching the display mode.

(14) The above devices are each specifically a computer system that is composed of a microprocessor, a ROM, a RAM, a hard disk unit, a display unit, a keyboard, a mouse, and so on. The RAM or the hard disk unit stores therein a computer program. The devices each realize respective functions by the microprocessor operating in accordance with the computer program. Here, the computer program is composed of combinations of instruction codes each indicating an instruction to a computer in order to achieve predetermined functions.

(15) Part or all of the structural elements of each of the above devices may be embodied as a single integrated circuit.

(16) Part or all of the structural elements of each of the above devices may be embodied as an IC card detachable from the device or a single module. The IC card or the module is a computer system composed of a microprocessor, a ROM, a RAM, and so on. The IC card or the module may include a super multifunctional LSI. Functions of the IC card or the module are achieved by the microprocessor operating in accordance with a computer program.

(17) Also, it may be possible to employ the structure in which a program that includes the procedure of the methods described in the above embodiment and modifications are stored in a memory, and the program is read by a CPU (Central Processing Unit) or the like from the memory to execute the read program, thereby realizing the above methods.

Alternatively, the program that includes the procedure of the above methods may be stored in a storage medium and be distributed. The storage medium for storing the above program is, for example, an IC card, a hard disk, an optical disc, a flexible disc, a ROM, and a flash memory.

(18) The present invention may be any combination of the above embodiment and modifications.

2.9. Summary

In recent years, 3D broadcasting is becoming more and more common in digital TV broadcasting. However, when a 3D program is selected as a program to be viewed via a user's operation in a digital TV receiver not supporting 3D viewing, this digital TV receiver has to perform 2D playback of images that are broadcast as a 3D program.

In view of this, it is required that the same program is available for 2D playback as well as 3D playback. The program should desirably be played back as full HD images for 2D display. In response to this request, there is a method in which a broadcasting station (transmission device) simulcasts two programs with respect to the same program, namely, a program for 2D playback and a program for 3D playback, as explained in the above embodiment.

In the case where a program that is the same as a 3D program is simulcast on a service channel as a 2D program, the reception and playback device can switch between the 2D program and the 3D program which are simulcast so as to switch from viewing of 2D images to viewing of 3D images, or from viewing of 3D images to viewing of 2D images for example.

By the way, when simulcast channel switching is performed via a user's operation, broadcast contents should be the same before and after the switching excepting the difference between 2D images and 3D images. Accordingly, switching between 2D images and 3D images via a user's operation requires information ensuring that the same contents are broadcast before and after the switching.

However, since 2D images and 3D images differ from each other in terms of viewpoints, all images of a 2D program and all images of a 3D program are not necessarily the same.

In view of this, in the case where a display mode switching instruction is issued by a user with respect to a 2D program and a 3D program that are simulcast, switchable section information is used as explained in the above embodiment. This allows the reception and playback device to judge whether automatic switching between the 2D program and the 3D program is permissible.

3. Supplement (1) One aspect of the present invention provides a reception and playback device comprising: an instruction reception unit configured to receive, with respect to a program that is currently played back in a first display mode, a switching instruction to switch a display mode from the first display mode to a second display mode; an informaiton reception unit configured to receive switching permission information indicating whether switching of a playback target stream of the program is permissible from a first stream corresponding to the first display mode to a second stream corresponding to the second display mode; a judgment unit configured to, when the instruction reception unit receives the switching instruction, judge whether switching of the display mode is permissible from the first display mode to the second display mode based on the switching permission information; and a playback processing unit configured to, when the judgment unit judges affirmatively, switch the playback target stream from the first stream to the second stream to perform playback using the second stream, and when the judgment unit judges negatively, perform playback using the first stream.

With this structure, when switching of the display mode of a program is permissible from the first display mode to the second display mode, the reception and playback device switches the display mode from the first display mode to the second display mode. Accordingly, the reception and playback device can play back images of the program in a viewer's desired display mode.

The instruction reception unit corresponds to the function of the 2D/3D switching unit 213 of receiving a switching instruction. The judgment unit corresponds to the function of the 2D/3D switching unit 213 of judging whether switching is permissible. Also, switchable section information in the above embodiment is equivalent to information indicating whether switching of the display mode is permissible in response to a switching instruction received via a user's operation, namely, the switching permission information explained above.

(2) Here, the first stream may be an MPEG2-TS (Moving Picture Experts Group 2-Transport Stream) compliant data stream, the switching permission information may be included in an EIT (Event Information Table) corresponding to the first stream, and the judgment unit may acquire the switching permission information from the EIT to judge whether switching of the display mode is permissible.

With this structure, the switching permission information is included in the EIT. Accordingly, the reception and playback device can switch the playback target stream from the first stream to the second stream, without notifying the user of switching of the playback target stream.

(3) Here, the first display mode may be a 3D display mode, and the second display mode is a 2D display mode, the first stream may be a 3D video stream, and the second stream may be a 2D video stream, when the judgment unit judges affirmatively, the playback processing unit may perform playback using the 2D video stream, and when the judgment unit judges negatively, the playback processing unit may perform playback for 2D display using the 3D video stream.

With this structure, even when there is no 2D video stream corresponding to the display mode after switching with respect to a program, the reception and playback device performs playback for 2D display using a 3D video stream. Accordingly, the reception and playback device can play back images of the program in a viewer's desired display mode.

(4) Here, the first display mode may be a 2D display mode, and the second display mode may be a 3D display mode, the first stream may be a 2D video stream, and the second stream may be a 3D video stream, when the judgment unit judges affirmatively, the playback processing unit may perform playback using the 3D video stream, and when the judgment unit judges negatively, the playback processing unit may perform playback for 3D display using the 2D video stream.

With this structure, even when there is no 3D video stream which is simulcast with respect to a program, the reception and playback device performs playback for 3D display using a 2D video stream. Accordingly, the reception and playback device can play back images of the program in a viewer's desired display mode.

(5) Here, the first display mode may be a display mode with a first resolution, and the second display mode may be a display mode with a second resolution that is lower than the first resolution, when the judgment unit judges affirmatively, the playback processing unit may perform playback using the second stream corresponding to the second resolution, and when the judgment unit judges negatively, the playback processing unit may perform playback using the first stream corresponding to the first resolution.

With this structure, the reception and playback device can play back images of a program with a viewer's desired resolution which is lower than a resolution that is currently used for playback.

(6) Here, the reception and playback device of Claim may further comprise a recording unit configured to record a program, wherein when recording of images of the program with the first resolution is impossible and the judgment unit judges affirmatively, the recording unit may record the images of the program with the second resolution.

With this structure, when recording of images having a high resolution is impossible, the reception and playback device can record the images with a resolution which is lower than the high resolution. Accordingly, the reception and playback device does not need to down-convert the images having the high resolution, thereby reducing deterioration in image quality and calculation costs caused by down-conversion.

(7) Here, the first display mode may be a display mode with a first resolution, and the second display mode may be a display mode with a second resolution that is higher than the first resolution, when the judgment unit judges affirmatively, the playback processing unit may perform playback using the second stream corresponding to the second resolution, and when the judgment unit judges negatively, the playback processing unit may perform playback using the first stream corresponding to the first resolution.

With this structure, the reception and playback device can play back images of a program with a viewer's desired resolution which is lower than a resolution that is currently used for playback.

(8) Here, the program that is included in the second stream may be divided into a plurality of sections, the switching permission information may include at least one piece of section information among a plurality of pieces of section information indicating one of the sections, the judgment unit may judge whether a reception time of the switching instruction belongs to the section indicated by the at least one piece of section information included in the switching permission information, when judging that the reception time belongs to the indicated section, the judgment unit may judge that switching of the display mode is permissible, and when judging that the reception time does not belong to the indicated section, the judgment unit may judge that switching of the display mode is impermissible.

With this structure, the reception and playback device can judge whether switching of the display mode is permissible with respect to a program included in a second stream which is a switching destination, based on a plurality of sections into which the program is divided.

(9) Also, one aspect of the present invention provides a transmission device comprising: a storage unit that stores therein switching permission information indicating, with respect to a playback target stream of a program to be played back by a reception and playback device, whether switching of the playback target stream is permissible from a first stream corresponding to a first display mode to a second stream corresponding to a second display mode; and a transmission unit configured to transmit the switching permission information.

With this structure, the transmission device transmits switching permission information indicating whether switching of the playback target stream is permissible from a first stream to a second stream with respect to a program. Accordingly, the reception and playback device can judge whether switching of the playback target stream is permissible based on the switching permission information, thereby to play back the program in a viewer's desired display mode.

(10) Here, the first stream may be an MPEG2-TS (Moving Picture Experts Group 2-Transport Stream) compliant data stream, the storage unit may store therein an EIT (Event Information Table) corresponding to the first stream and including the switching permission information, and the transmission unit may transmit a data stream into which at least the first stream and the EIT are multiplexed.

With this structure, the transmission device transmits the EIT which includes the switching permission information. Accordingly, the reception and playback device can switch the playback target stream from a first stream to a second stream, without notifying a user of switching of the playback target stream.

INDUSTRIAL APPLICABILITY

The present invention is applicable to a reception and playback device that plays back a first stream a second stream respectively corresponding to a first display mode and a second display mode, and to a transmission device that transmits a program included in the first stream and a program included in the second stream that are the same in terms of contents.

REFERENCE SIGNS LIST 10 program distribution system
100 transmission device
101 3D video encoder
102 2D video encoder
103 audio encoder
104 3D video stream storage unit
105 2D video stream storage unit
106 audio stream storage unit
107 multiplexing unit
108 transmission unit
109 program organization information storage unit
200 reception and playback device (digital TV receiver)
201 tuner
202 demultiplexing unit
203 program information management unit
205 video decoding unit
206 audio decoding unit
207 video display processing unit
208 display unit
209 playback processing unit
211 PSI/SI analysis unit
212 program information DB
213 2D/3D switching unit

The invention claimed is:

1. A reception and playback device comprising:
a processor; and
a non-transitory computer-readable memory having stored thereon executable instructions, which when executed by the processor, cause the reception and playback device to:
receive, with respect to a program that is currently played back in a first display mode, a switching instruction to switch a display mode from the first display mode to a second display mode;
receive switching permission information indicating whether switching of a playback target stream of the program is permissible from a first stream corresponding to the first display mode to a second stream corresponding to the second display mode;
judge, when the switching instruction is received, whether switching of the display mode is permissible from the first display mode to the second display mode based on the switching permission information; and
when the judgment is affirmative, switch the playback target stream from the first stream to the second stream to perform playback using the second stream, and when judgment is negative, perform playback using the first stream, wherein
the program is composed of a plurality of scenes,
the switching permission information defines, as a switchable scene, at least one of the plurality of scenes that is the same, except any difference between the first display mode and the second display mode, between the first stream and the second stream in terms of contents, and
with respect to the program that is currently played back in the first display mode, when the second stream exists and a scene that is played back is not the switchable scene defined by the switching permission information, the judgment is negative.

2. The reception and playback device of claim 1, wherein
the first stream is an MPEG2-TS (Moving Picture Experts Group 2-Transport Stream) compliant data stream,
the switching permission information is included in an EIT (Event Information Table) corresponding to the first stream, and
wherein the executable instructions, when executed by the processor, cause the reception and playback device to further acquire the switching permission information from the EIT to judge whether switching of the display mode is permissible.

3. The reception and playback device of claim 2, wherein
the first display mode is a 3D display mode, and the second display mode is a 2D display mode,
the first stream is a 3D video stream, and the second stream is a 2D video stream,
the executable instructions, when executed by the processor, cause the reception and playback device to further:
when the judgment is affirmative, perform playback using the 2D video stream, and
when the judgment is negative, perform playback for 2D display using the 3D video stream.

4. The reception and playback device of claim 2, wherein
the first display mode is a 2D display mode, and the second display mode is a 3D display mode,
the first stream is a 2D video stream, and the second stream is a 3D video stream,
the executable instructions, when executed by the processor, cause the reception and playback device to further:
when the judgment is affirmative, perform playback using the 3D video stream, and
when the judgment is negative, perform playback for 3D display using the 2D video stream.

5. The reception and playback device of claim 1, wherein
the first display mode is a display mode with a first resolution, and the second display mode is a display mode with a second resolution that is lower than the first resolution,
the executable instructions, when executed by the processor, cause the reception and playback device to further:
when the judgment is affirmative, perform playback using the second stream corresponding to the second resolution, and
when the judgment is negative, perform playback using the first stream corresponding to the first resolution.

6. The reception and playback device of claim 5, wherein the executable instructions, when executed by the processor, cause the reception and playback device to further:
record the program, and when recording of images of the program with the first resolution is impossible and the judgment is affirmative, record the images of the program with the second resolution.

7. The reception and playback device of claim 1, wherein the first display mode is a display mode with a first resolution, and the second display mode is a display mode with a second resolution that is higher than the first resolution,
the executable instructions, when executed by the processor, cause the reception and playback device to further:
when the judgment is affirmative, perform playback using the second stream corresponding to the second resolution, and
when the judgment is negative, perform playback using the first stream corresponding to the first resolution.

8. The reception and playback device of claim 1, wherein the switching permission information includes a piece of section information indicating a section of the switchable scene,
the executable instructions, when executed by the processor, cause the reception and playback device to further:
judge whether a reception time of the switching instruction belongs to the section indicated by the piece of section information included in the switching permission information,
judge, when judging that the reception time belongs to the indicated section, that switching of the display mode is permissible, and
judge, when judging that the reception time does not belong to the indicated section, that switching of the display mode is impermissible.

9. A transmission device comprising:
a processor; and
a non-transitory computer-readable memory having stored thereon executable instructions, which when executed by the processor, cause the transmission device to:
store therein switching permission information indicating, with respect to a playback target stream of a program to be played back by a reception and playback device, whether switching of the playback target stream is permissible from a first stream corresponding to a first display mode to a second stream corresponding to a second display mode; and
transmit the switching permission information, the first stream, and the second stream, wherein
the program is composed of a plurality of scenes, and
the switching permission information defines, as a switchable scene, at least one of the plurality of scenes that is the same, except any difference between the first display mode and the second display mode, between the first stream and the second stream in terms of contents.

10. The transmission device of claim 9, wherein
the first stream is an MPEG2-TS (Moving Picture Experts Group 2-Transport Stream) compliant data stream,
the executable instructions, when executed by the processor, cause the reception and playback device to further:
store therein an EIT (Event Information Table) corresponding to the first stream and including the switching permission information, and
transmit a data stream into which at least the first stream and the EIT are multiplexed.

11. A reception and playback method for use in a reception and playback device, the reception and playback method comprising:
receiving, with respect to a program that is currently played back in a first display mode, a switching instruction to switch a display mode from the first display mode to a second display mode;
receiving switching permission information indicating whether switching of a playback target stream of the program is permissible from a first stream corresponding to the first display mode to a second stream corresponding to the second display mode;
judging, when the switching instruction is received, whether switching of the display mode is permissible from the first display mode to the second display mode based on the switching permission information; and
switching, when the judging judges affirmatively, the playback target stream from the first stream to the second stream to perform playback using the second stream, and when the judging judges negatively, performing playback using the first stream, wherein
the program is composed of a plurality of scenes,
the switching permission information defines, as a switchable scene, at least one of the plurality of scenes that is the same, except any difference between the first display mode and the second display mode, between the first stream and the second stream in terms of contents, and
with respect to the program that is currently played back in the first display mode, when the second stream exists and a scene that is played back is not the switchable scene defined by the switching permission information, the judging judges negatively.

12. A transmission method for use in a transmission device, the transmission method comprising:
storing switching permission information indicating, with respect to a playback target stream of a program to be played back by a reception and playback device, whether switching of the playback target stream is permissible from a first stream corresponding to a first display mode to a second stream corresponding to a second display mode; and
transmitting the switching permission information, the first stream, and the second stream, wherein
the program is composed of a plurality of scenes, and
the switching permission information defines, as a switchable scene, at least one of the plurality of scenes that is the same, except any difference between the first display mode and the second display mode, between the first stream and the second stream in terms of contents.

* * * * *